US008571231B2

(12) United States Patent
Ramakrishnan et al.

(10) Patent No.: US 8,571,231 B2
(45) Date of Patent: Oct. 29, 2013

(54) SUPPRESSING NOISE IN AN AUDIO SIGNAL

(75) Inventors: Dinesh Ramakrishnan, San Diego, CA (US); Homayoun Shahri, San Diego, CA (US); Song Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 12/782,147

(22) Filed: May 18, 2010

(65) Prior Publication Data

US 2011/0081026 A1 Apr. 7, 2011

Related U.S. Application Data

(60) Provisional application No. 61/247,888, filed on Oct. 1, 2009.

(51) Int. Cl.
*H04B 15/00* (2006.01)

(52) U.S. Cl.
USPC ........ 381/94.2; 381/94.1; 381/94.3; 704/226; 704/233

(58) Field of Classification Search
USPC ................ 381/94.1–94.3, 94.7; 704/226, 233
See application file for complete search history.

(56) References Cited

U.S. PATENT DOCUMENTS

| | | | | |
|---|---|---|---|---|
| 2004/0037432 | A1 * | 2/2004 | Lis et al. | 381/71.11 |
| 2004/0052384 | A1 | 3/2004 | Ashley et al. | |
| 2009/0089054 | A1 * | 4/2009 | Wang et al. | 704/233 |
| 2010/0088094 | A1 * | 4/2010 | Wang | 704/233 |
| 2010/0198603 | A1 * | 8/2010 | Paranjpe | 704/500 |
| 2011/0035213 | A1 * | 2/2011 | Malenovsky et al. | 704/208 |

FOREIGN PATENT DOCUMENTS

| | | | |
|---|---|---|---|
| CN | 1565144 | A | 1/2005 |
| CN | 1656757 | A | 8/2005 |
| CN | 1905006 | A | 1/2007 |
| JP | 10161694 | A | 6/1998 |
| JP | 2007226264 | A | 9/2007 |
| JP | 2008216721 | A | 9/2008 |
| JP | 2008293038 | A | 12/2008 |
| KR | 20070061126 | A | 6/2007 |
| KR | 20070061216 | A | 6/2007 |
| WO | 2010089976 | A1 | 8/2010 |

OTHER PUBLICATIONS

International Search Report—PCT/US2010/051209—ISA/EPO—May 24, 2011.

(Continued)

*Primary Examiner* — Disler Paul
(74) *Attorney, Agent, or Firm* — Espartaco Diaz Hidalgo

(57) ABSTRACT

An electronic device for suppressing noise in an audio signal is described. The electronic device includes a processor and instructions stored in memory. The electronic device receives an input audio signal and computes an overall noise estimate based on a stationary noise estimate, a non-stationary noise estimate and an excess noise estimate. The electronic device also computes an adaptive factor based on an input Signal-to-Noise Ratio (SNR) and one or more SNR limits. A set of gains is also computed using a spectral expansion gain function. The spectral expansion gain function is based on the overall noise estimate and the adaptive factor. The electronic device also applies the set of gains to the input audio signal to produce a noise-suppressed audio signal and provides the noise-suppressed audio signal.

46 Claims, 16 Drawing Sheets

(56) References Cited

OTHER PUBLICATIONS

Israel Cohen et al., "Speech enhancement for non-stationary noise environments", Signal Processing 81, pp. 2403-2418, Oct. 2001, See the abstract and sections 2-5.

Nakayama, et al., "A noise spectral estimation method based on VAD and recursive averaging using new adaptive meters or non-stationary noise environments", ISPACS 2008, Feb. 2009, See the abstract and section IV.

Written Opinion—PCT/US2010/051209, International Search Authority—European Patent Office, May 24, 2011.

* cited by examiner

SUPPRESSING NOISE IN AN AUDIO SIGNAL

RELATED APPLICATIONS

This application is related to and claims priority from U.S. Provisional Patent Application Ser. No. 61/247,888 filed Oct. 1, 2009, for "Enhanced Noise Suppression with Single Input Audio Signal."

TECHNICAL FIELD

The present disclosure relates generally to electronic devices. More specifically, the present disclosure relates to suppressing noise in an audio signal.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices capture or receive an external input. For example, many electronic devices capture sounds (e.g., audio signals). For instance, an electronic device might use an audio signal to record sound. An audio signal can also be used to reproduce sounds. Some electronic devices process audio signals to enhance them in some way. Many electronic devices also transmit and/or receive electromagnetic signals. Some of these electromagnetic signals can represent audio signals.

Sounds are often captured in a noisy environment. When this occurs, electronic devices often capture noise in addition to the desired sound. For example, the user of a cell phone might make a call in a location with significant background noise (e.g., in a car, in a train, in a noisy restaurant, outdoors, etc.). When such noise is also captured, the quality of the resulting audio signal may be degraded. For example, when the captured sound is reproduced using a degraded audio signal, the desirable sound can be corrupted and difficult to distinguish from the noise. As this discussion illustrates, improved systems and methods for reducing noise in an audio signal may be beneficial.

DETAILED DESCRIPTION

Figure 1:
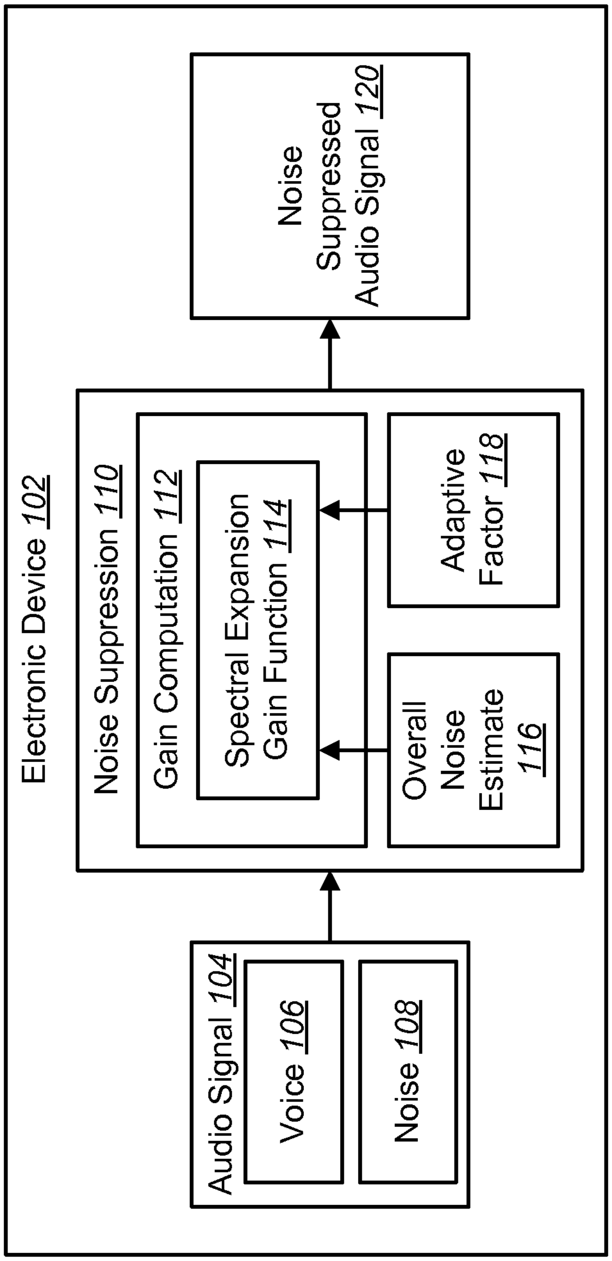
FIG. 1 is a block diagram illustrating one example of an electronic device in which systems and methods for suppressing noise in an audio signal may be implemented.

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station may operate in accordance with certain industry standards, such as the Institute of Electrical and Electronics Engineers (IEEE) 802.11a, 802.11b, 802.11g, 802.11n, 802.11ac (e.g., Wireless Fidelity or "Wi-Fi") standards. Other examples of standards that a base station may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes a communication device (e.g., access terminal, client device, client station, etc.) that may wirelessly connect to a base station. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

Voice communication is one function often performed by wireless communication devices. In the recent past, many signal processing solutions have been presented for enhancing voice quality in wireless communication devices. Some solutions are useful only on the transmit or uplink side. Improvement of voice quality on the downlink side may require solutions that can provide noise suppression using just a single input audio signal. The systems and methods disclosed herein present enhanced noise suppression that may use a single input signal and may provide improved capability to suppress both stationary and non-stationary noise in the input signal.

The systems and methods disclosed herein pertain generally to the field of signal processing solutions used for improving voice quality of electronic devices (e.g., wireless communication devices). More specifically, the systems and methods disclosed herein focus on suppressing noise (e.g., ambient noise, background noise) and improving the quality of the desired signal.

In electronic devices (e.g., wireless communication devices, voice recorders, etc.), improved voice quality is desirable and beneficial. Voice quality is often affected by the presence of ambient noise during the usage of an electronic device. One approach for improving voice quality in noisy scenarios is to equip the electronic device with multiple microphones and use sophisticated signal processing techniques to separate the desired voice from the ambient noise. However, this may only work in certain scenarios (e.g., on the uplink side for a wireless communication device). In other scenarios (e.g., on the downlink side for a wireless communication device, when the electronic device has only one microphone, etc.), the only available audio signal is a monophonic (e.g., "mono" or monaural) signal. In such a scenario, only single input signal processing solutions may be used to suppress noise in the signal.

In the context of communication devices (e.g., one kind of electronic device), noise from the far-end may impact downlink voice quality. Furthermore, single or multiple microphone noise suppression in the uplink may not offer immediate benefits to the near-end user of the wireless communication device. Additionally, some communication devices (e.g., landline telephones) may not have any noise suppression. Some devices provide single-microphone stationary noise suppression. Thus, far-end noise suppression may be beneficial if it provides non-stationary noise suppression. In this context, far-end noise suppression may be incorporated in the downlink path to suppress noise and improve voice quality in communication devices.

Many earlier single-input noise suppression solutions are capable of suppressing only stationary noises such as motor noise, thermal noise, engine noise, etc. That is, they may be incapable of suppressing non-stationary noise. Furthermore, single input noise suppression solutions often compromise the quality of the desired signal if the amount of noise suppression is increased beyond an extent. In voice communication systems, preserving the voice quality while suppressing the noise may be beneficial, especially on the downlink side. Many of the existing single-input noise suppression techniques are inadequate for this purpose.

The systems and methods disclosed herein provide noise suppression that may be used for single or multiple inputs and may provide suppression of both stationary and non-stationary noises while preserving the quality of the desired signal. The systems and methods herein employ speech-adaptive spectral expansion (and/or compression or "companding") techniques to provide improved quality of the output signal. They may be applied to narrow-band, wide-band or inputs of any sampling rate. Additionally, they may be used for suppressing noise in both voice and music input signals. Some of the applications of the systems and methods disclosed herein include single or multiple microphone noise suppression for improving the downlink voice quality in wireless (or mobile) communications, noise suppression for voice and audio recording, etc.

An electronic device for suppressing noise in an audio signal is disclosed. The electronic device includes a processor and instructions stored in memory. The electronic device receives an input audio signal and computes an overall noise estimate based on a stationary noise estimate, a non-stationary noise estimate and an excess noise estimate. The electronic device also computes an adaptive factor based on an input Signal-to-Noise Ratio (SNR) and one or more SNR limits. A set of gains is computed using a spectral expansion gain function. The spectral expansion gain function is based on the overall noise estimate and the adaptive factor. The electronic device applies the set of gains to the input audio signal to produce a noise-suppressed audio signal and provides the noise-suppressed audio signal.

The electronic device may also compute weights for the stationary noise estimate, the non-stationary noise estimate and the excess noise estimate. The stationary noise estimate may be computed by tracking power levels of the input audio signal. Tracking power levels of the input audio signal may be implemented using a sliding window.

The non-stationary noise estimate may be a long-term estimate. The excess noise estimate may be a short-term estimate. The spectral expansion gain function may be further based on a short-term SNR estimate. The spectral expansion gain function may include a base and an exponent. The base may include an input signal power divided by the overall noise estimate, and the exponent may include a desired noise suppression level divided by the adaptive factor.

The electronic device may compress the input audio signal into a number of frequency bins. The compression may include averaging data across multiple frequency bins, where lower frequency data in one or more lower frequency bins is compressed less than higher frequency data in one or more high frequency bins.

The electronic device may also compute a Discrete Fourier Transform (DFT) of the input audio signal and compute an Inverse Discrete Fourier Transform (IDFT) of the noise-suppressed audio signal. The electronic device may be a wireless communication device. The electronic device may be a base station. The electronic device may store the noise-suppressed audio signal in the memory. The input audio signal may be received from a remote wireless communication device. The one or more SNR limits may be multiple turning points used to determine gains differently for different SNR regions.

The spectral expansion gain function may be computed according to the equation $$G(n,k)=\min\left\{b*\left(\frac{A(n,k)}{A_{on}(n,k)}\right)^{B/A},1\right\},$$

where G(n,k) is the set of gains, n is a frame number, k is a bin number, B is a desired noise suppression limit, A is the adaptive factor, b is a factor based on B, A(n,k) is an input magnitude estimate and $A_{on}(n,k)$ is the overall noise estimate. The excess noise estimate may be computed according to the equation $A_{en}(n,k)=\max\{\beta_{NS}A(n,k)-\gamma_{cn}A_{cn}(n,k),\ 0\}$, where $A_{en}(n,k)$ is the excess noise estimate, n is a frame number, k is a bin number, $\beta_{NS}$ is a desired noise suppression limit, A(n,k) is an input magnitude estimate, $\gamma_{cn}$ is a combined scaling factor and $A_{cn}(n,k)$ is a combined noise estimate.

The overall noise estimate may be computed according to the equation $A_{on}(n,k)=\gamma_{cn}A_{cn}(n,k)+\gamma_{en}A_{en}(n,k)$, where $A_{on}(n,k)$ is the overall noise estimate, n is a frame number, k is a bin number, $\gamma_{cn}$ is a combined scaling factor, $A_{cn}(n,k)$ is a combined noise estimate, $\gamma_{en}$ is an excess noise scaling factor and $A_{en}(n,k)$ is the excess noise estimate. The input audio signal may be a wideband audio signal that is split into multiple frequency bands and noise suppression is performed on each of the multiple frequency bands.

The electronic device may smooth the stationary noise estimate, a combined noise estimate, the input SNR and the set of gains.

A method for suppressing noise in an audio signal is also disclosed. The method includes receiving an input audio signal and computing an overall noise estimate based on a stationary noise estimate, a non-stationary noise estimate and an excess noise estimate on an electronic device. The method also includes computing an adaptive factor based on an input Signal-to-Noise Ratio (SNR) and one or more SNR limits. The method further includes computing a set of gains using a spectral expansion gain function on the electronic device. The spectral expansion gain function is based on the overall noise estimate and the adaptive factor. The method also includes applying the set of gains to the input audio signal to produce a noise-suppressed audio signal and providing the noise-suppressed audio signal.

A computer-program product for suppressing noise in an audio signal is also disclosed. The computer-program product includes instructions on a non-transitory computer-readable medium. The instructions include code for receiving an input audio signal and code for computing an overall noise estimate based on a stationary noise estimate, a non-stationary noise estimate and an excess noise estimate. The instructions also include code for computing an adaptive factor based on an input Signal-to-Noise Ratio (SNR) and one or more SNR limits and code for computing a set of gains using a spectral expansion gain function. The spectral expansion gain function is based on the overall noise estimate and the adaptive factor. The instructions further include code for applying the set of gains to the input audio signal to produce a noise-suppressed audio signal and code for providing the noise-suppressed audio signal.

An apparatus for suppressing noise in an audio signal is also disclosed. The apparatus includes means for receiving an input audio signal and means for computing an overall noise estimate based on a stationary noise estimate, a non-stationary noise estimate and an excess noise estimate. The apparatus also includes means for computing an adaptive factor based on an input Signal-to-Noise Ratio (SNR) and one or more SNR limits and means for computing a set of gains using a spectral expansion gain function. The spectral expansion gain function is based on the overall noise estimate and the adaptive factor. The apparatus further includes means for applying the set of gains to the input audio signal to produce a noise-suppressed audio signal and means for providing the noise-suppressed audio signal.

The systems and methods disclosed herein describe a noise suppression module on an electronic device that takes at least one audio input signal and provides a noise suppressed output signal. That is, the noise suppression module may suppress background noise and improve voice quality in an audio signal. The noise suppression module may be implemented as hardware, software or a combination of both. The module may take a Discrete Fourier Transform (DFT) of the audio signal (to transform it into the frequency domain) and operates on the magnitude spectrum of the input to compute a set of gains (e.g., at each frequency bin) that can be applied to the DFT of the input signal (e.g., by scaling the DFT of the input signal using the set of gains). The noise suppressed output may be synthesized by taking the Inverse DFT (IDFT) of the input signal with the applied gains.

The systems and methods disclosed herein may offer both stationary and non-stationary noise suppression. In order to accomplish this, several (e.g., three) different types of noise power estimates may be computed at each frequency bin and combined to yield an overall noise estimate at that bin. For example, an estimate of the stationary noise spectral estimate is computed by employing minimum statistics techniques and tracking the minima (e.g., minimum power levels) of the input spectrum across a period of time. A detector may be employed to detect the presence of the desired signal in the input. The detector output may be used to form a non-stationary noise spectral estimate. The non-stationary noise estimate may be obtained by intelligently averaging the input spectral estimate based on the detector's decision. For example, the non-stationary noise estimate may be updated rapidly during the absence of speech and slowly during the presence of speech. An excess noise estimate may be computed from the residual noise in the spectrum when speech is not detected. Scaling factors for the noise estimates may be derived based on the Signal to Noise Ratio (SNR) of the input data. Spectral averaging may also be employed to compress the input spectral estimates into fewer frequency bins to both simulate bands of hearing and reduce the computational burden of the algorithm.

The systems and methods disclosed herein employ speech-adaptive spectral expansion (and/or compression or "companding") techniques to produce a set of gains to be applied on the input spectrum. The input spectral estimates and the noise spectral estimates are used to compute Signal-to-Noise Ratio (SNR) estimates of the input. The SNR estimates are used to compute the set of gains. The aggressiveness of the noise suppression may be automatically adjusted based on the SNR estimates of the input. In particular, the noise suppression may be increased (e.g., "made aggressive") if the input SNR is low and may be decreased if the input SNR is high. The set of gains may be further smoothed across time and/or frequency to reduce discontinuities and artifacts in the output signal. The set of gains may be applied to the DFT of the input signal. An IDFT may be taken of the frequency domain input signal with the applied gains to re-construct noise suppressed time domain data. This approach may adequately suppress noise without significant degradation to the desired speech or voice.

In the case of wideband signals, a filter bank may be employed to split the input signal into a set of frequency bands. The noise suppression may be applied on all bands to suppress noise in the input signal.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for suppressing noise 108 in an audio signal 104 may be implemented. The electronic device 102 may include a noise suppression module 110. The noise suppression module 110 may be implemented as hardware, as software or as a combination of hardware and software. The noise suppression module 110 may receive or take an audio signal 104 and output a noise-suppressed audio signal 120. The audio signal 104 may include voice 106 (e.g., speech, voice energy, voice signal or other desired signal) and noise 108 (e.g., noise energy or signals causing noise).

The noise suppression module 110 may suppress noise 108 in the audio signal 104 while preserving voice 106. The noise suppression module 110 may include a gain computation module 112. The gain computation module 112 computes a set of gains that may be applied to the audio signal 104 in order to produce the noise suppressed audio signal 120. The gain computation module 112 may use a spectral expansion gain function 114 in order to compute the set of gains. The spectral expansion gain function 114 may use an overall noise estimate 116 and/or an adaptive factor 118 to compute the set of gains. In other words, the spectral expansion gain function 114 may be based on the overall noise estimate 116 and the adaptive factor 118.

Figure 2:
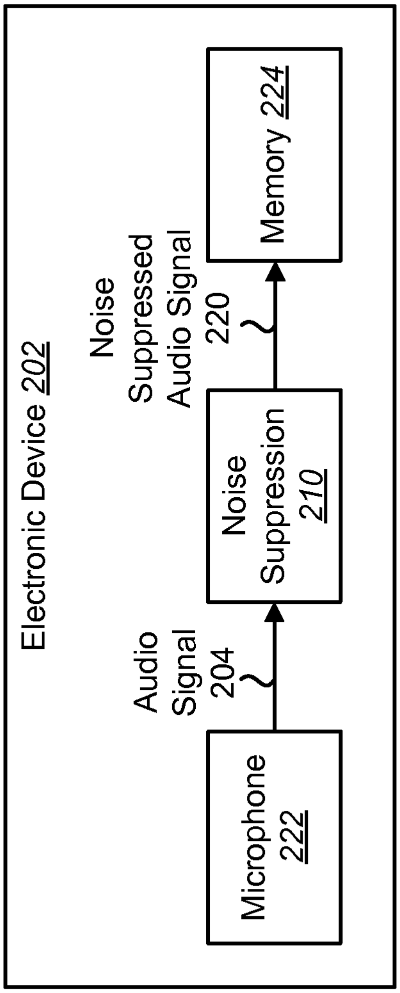
FIG. 2 is a block diagram illustrating one example of an electronic device in which systems and methods for suppressing noise in an audio signal may be implemented.

FIG. 2 is a block diagram illustrating one example of an electronic device 202 in which systems and methods for suppressing noise in an audio signal 204 may be implemented. Examples of the electronic device 202 include audio (e.g., voice) recorders, video camcorders, cameras, personal computers, laptop computers, Personal Digital Assistants (PDAs), cellular phones, smart phones, music players, game consoles and hearing aids, etc.

The electronic device 202 may include one or more microphones 222, a noise suppression module 210 and memory 224. A microphone 222 may be a device used to convert an acoustic signal (e.g., sounds) into an electronic signal. Examples of microphones 222 include sensors or transducers. Some types of microphones include dynamic, condenser, ribbon, electrostatic, carbon, capacitor, piezoelectric, and fiber optic microphones, etc. The noise suppression module 210 suppresses noise in the audio signal 204 to produce a noise suppressed audio signal 220. Memory 224 may be a device used to store an electronic signal or data (e.g., a noise-suppressed audio signal 220) produced by the noise suppression module 210. Examples of memory 224 include a hard disk drive, Random Access Memory (RAM), Read-Only Memory (ROM), flash memory, etc. Memory 224 may be used to store a noise suppressed audio signal 220.

Figure 3:
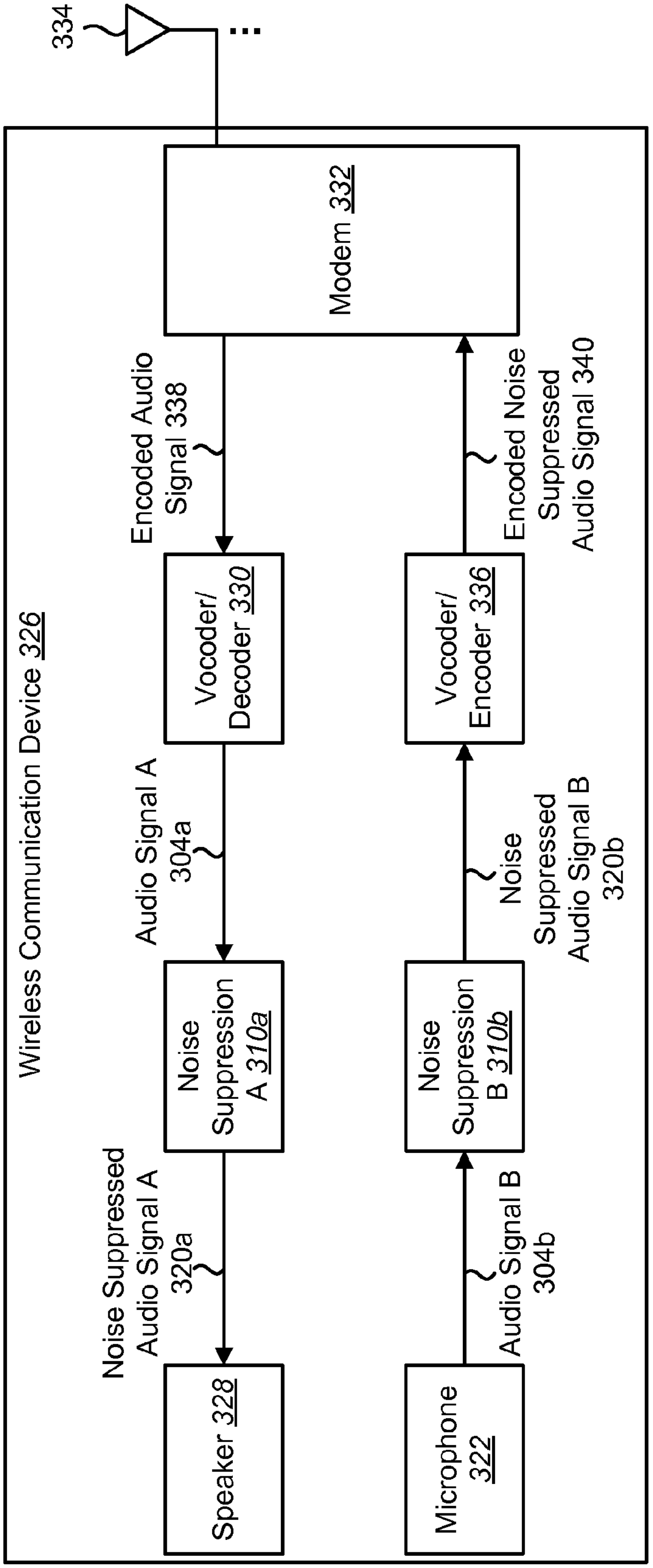
FIG. 3 is a block diagram illustrating one configuration of a wireless communication device in which systems and methods for suppressing noise in an audio signal may be implemented.

FIG. 3 is a block diagram illustrating one configuration of a wireless communication device 326 in which systems and methods for suppressing noise in an audio signal may be implemented. The wireless communication device 326 may be an electronic device 102 used to communicate with other devices (e.g., base stations, access points, other wireless communication devices, etc.). Examples of wireless communication devices 326 include cellular phones, laptop computers, smart phones, e-readers, PDAs, netbooks, music players, etc. The wireless communication device 326 may include one or more speakers 328, noise suppression module A 310*a*, a vocoder/decoder 330, a modem 332 and one or more antennas 334. The wireless communication device 326 may also include a vocoder/encoder 336, noise suppression module B 310*b* and one or more microphones 322.

The wireless communication device 326 may be configured for capturing an audio signal, suppressing noise in the audio signal and/or transmitting the audio signal. In one configuration, the microphone 322 captures an acoustic signal (e.g., including speech or voice) and converts it into audio signal B 304*b*. Audio signal B 304*b* may be input into noise suppression module B 310*b*, which may suppress noise (e.g., ambient or background noise) in audio signal B 304*b*, thereby producing noise suppressed audio signal B 320*b*. Noise suppressed audio signal B 320*b* may be input into the vocoder/encoder 336, which produces an encoded noise suppressed audio signal 340 in preparation for wireless transmission. The modem 332 may modulate the encoded noise suppressed audio signal 340 for wireless transmission. The wireless communication device 326 may then transmit the modulated signal using the one or more antennas 334.

The wireless communication device 326 may additionally or alternatively be configured for receiving an audio signal, suppressing noise in the audio signal and/or acoustically reproducing the audio signal. In one configuration, the wireless communication device 326 receives a modulated signal using the one or more antennas 334. The wireless communication device 326 demodulates the received modulated signal using the modem 332 to produce an encoded audio signal 338. The encoded audio signal 338 may be decoded using the vocoder/decoder module 330 to produce audio signal A 304*a*. Noise suppression module A 310*a* may then suppress noise in audio signal A 304*a*, resulting in noise suppressed audio signal A 320*a*. Noise suppressed audio signal A 304*a* may then be converted to an acoustic signal (e.g., output or reproduced) using the one or more speakers 328.

Figure 4:
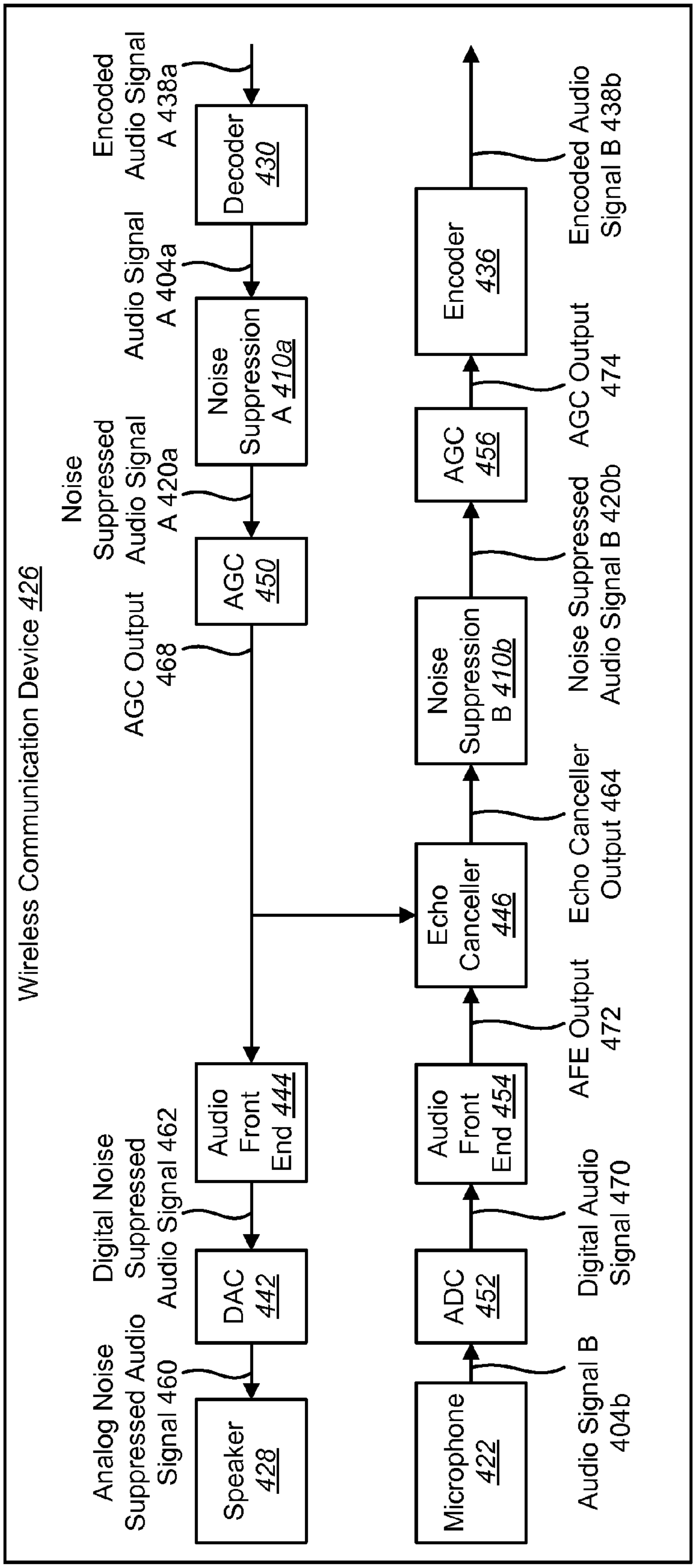
FIG. 4 is a block diagram illustrating another more specific configuration of a wireless communication device in which systems and methods for suppressing noise in an audio signal may be implemented.

FIG. 4 is a block diagram illustrating another more specific configuration of a wireless communication device 426 in which systems and methods for suppressing noise in an audio signal may be implemented. The wireless communication device 426 may include several modules used for receiving and/or outputting an audio signal (e.g., using one or more speakers 428). For example, the wireless communication device 426 may include one or more speakers 428, a Digital to Analog Converter (DAC) 442, a first Audio Front End (AFE) module 444, a first Automatic Gain Control (AGC) module 450, noise suppression module A 410*a* and a decoder 430. The wireless communication device 426 may also include several modules used for capturing an audio signal and formatting it for transmission. For example, the wireless communication device 426 may include one or more microphones 422, an Analog to Digital Converter (ADC) 452, a second Audio Front End (AFE) 454 module, an echo canceller module 446, noise suppression module B 410*b*, a second Automatic Gain Control (AGC) module 456 and an encoder 436. The wireless communication device 426 may also transmit the audio signal.

The wireless communication device 426 may receive encoded audio signal A 438*a*. The wireless communication device 426 may decode encoded audio signal A 438*a* using the decoder 430 to produce audio signal A 404*a*. Noise suppression module A 410*a* may be implemented after the decoder 430 to suppress background noise in the downlink audio. That is, noise suppression module A 410*a* may suppress noise in audio signal A 404*a*, thereby producing noise suppressed audio signal A 420*a*. The first AGC module 450 may adjust or control the magnitude or volume of noise suppressed audio signal A 420*a* to produce a first AGC output 468. The first AGC output 468 may be input into the first audio front end module 444 and the echo canceller module 446. The first audio front end module 444 receives the first AGC output 468 and produces a digital noise suppressed audio signal 462. In general, the audio front end modules 444, 454 may perform basic filtering and gain operations on the captured microphone signal (e.g., audio signal B 404*b*, digital audio signal 470) and/or the downlink signal (e.g., the first AGC output 468) going to the DAC 442. The digital noise suppressed audio signal 462 may be converted to an analog noise suppressed audio signal 460 by the DAC 442. The analog noise suppressed audio signal 460 may be output by one or more speakers 428. The one or more speakers 428 generally convert (electronic) audio signals into acoustic signals or sounds.

The wireless communication device 426 may capture audio signal B 404*b* using one or more microphones 422. The one or more microphones 422, for example, may convert an acoustic signal (e.g., including voice, speech, noise, etc.) into audio signal B 404*b*. Audio signal B 404*b* may be an analog signal that is converted into a digital audio signal 470 using the ADC 452. The second audio front end 454 produces an AFE output 472. The AFE output 472 may be input into the echo canceller module 446. The echo canceller module 446 may suppress echo in the signal for transmission. For example, the echo canceller module 446 produces an echo canceller output 464. Noise suppression module B 410*b* may suppress noise in the echo canceller output 464, thereby producing noise suppressed audio signal B 420*b*. The second AGC module 456 may produce a second AGC output signal 474 by adjusting the magnitude or volume of noise suppressed audio signal B 420*b*. The second AGC output signal 474 may also be encoded by the encoder 436 to produce encoded audio signal B 438*b*. Encoded audio signal B 438*b* may be further processed and/or transmitted. Optionally, the wireless communication device 426 (in one configuration) may not suppress noise in audio signal B 404*b* for transmission.

In the wireless communication device 426 illustrated in FIG. 4, it can be observed that noise suppression module A 410*a* may suppress noise in a received audio signal (e.g., audio signal A 404*a*). This may be useful when the wireless communication device 426 receives audio signals 404*a* including noise that can be (further) suppressed or audio signals 404*a* from other devices that do not have noise suppression (e.g., "land-line" telephones).

Figure 5:
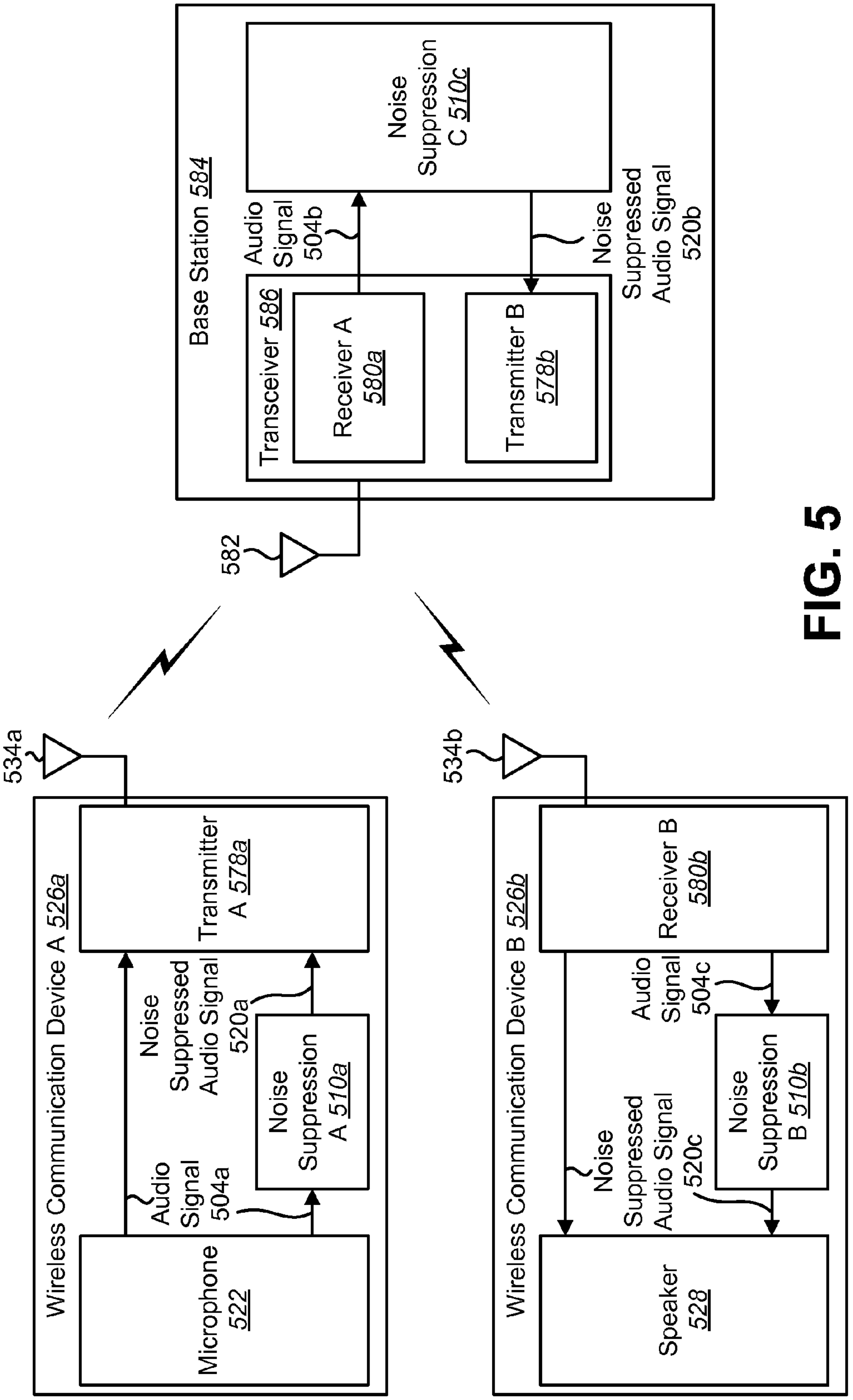
FIG. 5 is a block diagram illustrating multiple configurations of wireless communication devices and a base station in which systems and methods for suppressing noise in an audio signal may be implemented.

FIG. 5 is a block diagram illustrating multiple configurations of wireless communication devices 526 and a base station 584 in which systems and methods for suppressing noise in an audio signal may be implemented. Wireless communication device A 526*a* may include one or more microphones 522, transmitter A 578*a* and one or more antennas 534*a*. Wireless communication device A 526*a* may also include a receiver (not shown for convenience). The one or more microphones 522 convert an acoustic signal into an audio signal 504*a*. Transmitter A 578*a* transmits electromagnetic signals (e.g., to the base station 584) using the one or more antennas 534*a*. Wireless communication device A 526*a* may also receive electromagnetic signals from the base station 584.

The base station 584 may include one or more antennas 582, receiver A 580*a* and transmitter B 578*b*. Receiver A 580*a* and transmitter B 578*b* may be collectively referred to as a transceiver 586. Receiver A 580*a* receives electromagnetic signals (e.g., from wireless communication device A 526*a* and/or wireless communication device B 526*b*) using the one or more antennas 582. Transmitter B 578*b* transmits electromagnetic signals (e.g., to wireless communication device B 526*b* and/or wireless communication device A 526*a*) using the one or more antennas 582.

Wireless communication device B 526*b* may include one or more speakers 528, receiver B 580*b* and one or more antennas 534*b*. Wireless communication device B 526*b* may also include a transmitter (not shown for convenience) for transmitting electromagnetic signals using the one or more antennas 534*b*. Receiver B 580*b* receives electromagnetic signals using the one or more antennas 534*b*. The one or more speakers 528 convert electronic audio signals into acoustic signals.

In one configuration, uplink noise suppression is performed on an audio signal 504*a*. In this configuration, wireless communication device A 526*a* includes noise suppression module A 510*a*. Noise suppression module A 510*a* suppresses noise in an audio signal 504*a* in order to produce a noise suppressed audio signal 520*a*. The noise suppressed audio signal 520*a* is transmitted to the base station 584 using transmitter A 578*a* and one or more antennas 534*a*. The base station 584 receives the noise suppressed audio signal 520*a* and transmits it 520*a* to wireless communication device B 526*b* using the transceiver 586 and one or more antennas 582. Wireless communication device B 526*b* receives the noise suppressed audio signal 520*c* using receiver B 580*b* and one or more antennas 534*b*. The noise suppressed audio signal 520*c* is then converted to an acoustic signal (e.g., output) by the one or more speakers 528.

In another configuration, noise suppression is performed on the base station 584. In this configuration, wireless communication device A 526*a* captures an audio signal 504*a* using one or more microphones 522 and transmits it 504*a* to the base station 584 using transmitter A 578*a* and one or more antennas 534*a*. The base station 584 receives the audio signal 504*b* using one or more antennas 582 and receiver A 580*a*. Noise suppression module C 510*c* suppresses noise in the audio signal 504*b* to produce a noise suppressed audio signal 520*b*. The noise suppressed audio signal 520*b* is transmitted to wireless communication device B 526*b* using transmitter B 578*b* and one or more antennas 582. Wireless communication device B 526*b* uses one or more antennas 534*b* and receiver B 580*b* to receive the noise suppressed audio signal 520*c*. The noise suppressed audio signal 520*c* is then output using one or more speakers 528.

In yet another configuration, downlink noise suppression is performed on an audio signal 504*c*. In this configuration, an audio signal 504*a* is captured on wireless communication device A 526*a* using one or more microphones 522 and transmitted to the base station 584 using transmitter A 578*a* and one or more antennas 534*a*. The base station 584 receives and transmits the audio signal 504*a* using the transceiver 586 and one or more antennas 582. Wireless communication device B 526*b* receives the audio signal 504*c* using one or more antennas 534*b* and receiver B 580*b*. Noise suppression module B 510*b* suppresses noise in the audio signal 504*c* to produce a noise suppressed audio signal 520*c* which is converted into an acoustic signal using one or more speakers 528.

Other configurations are possible. That is, noise suppression 510 may be carried out on any combination of the transmitting wireless communication device 526*a*, the base station 584 and/or the receiving wireless communication device 526*b*. For example, noise suppression 510 may be performed by both transmitting and receiving wireless communication devices 526*a-b*. Or, noise suppression may be performed by the transmitting wireless communication device 526*a* and the base station 584. Alternatively, noise suppression may be performed by the base station 584 and the receiving wireless communication device 526*b*. Furthermore, noise suppression may be performed by the transmitting wireless communication device 526*a*, the base station 584 and the receiving wireless communication device 526*b*.

Figure 6:
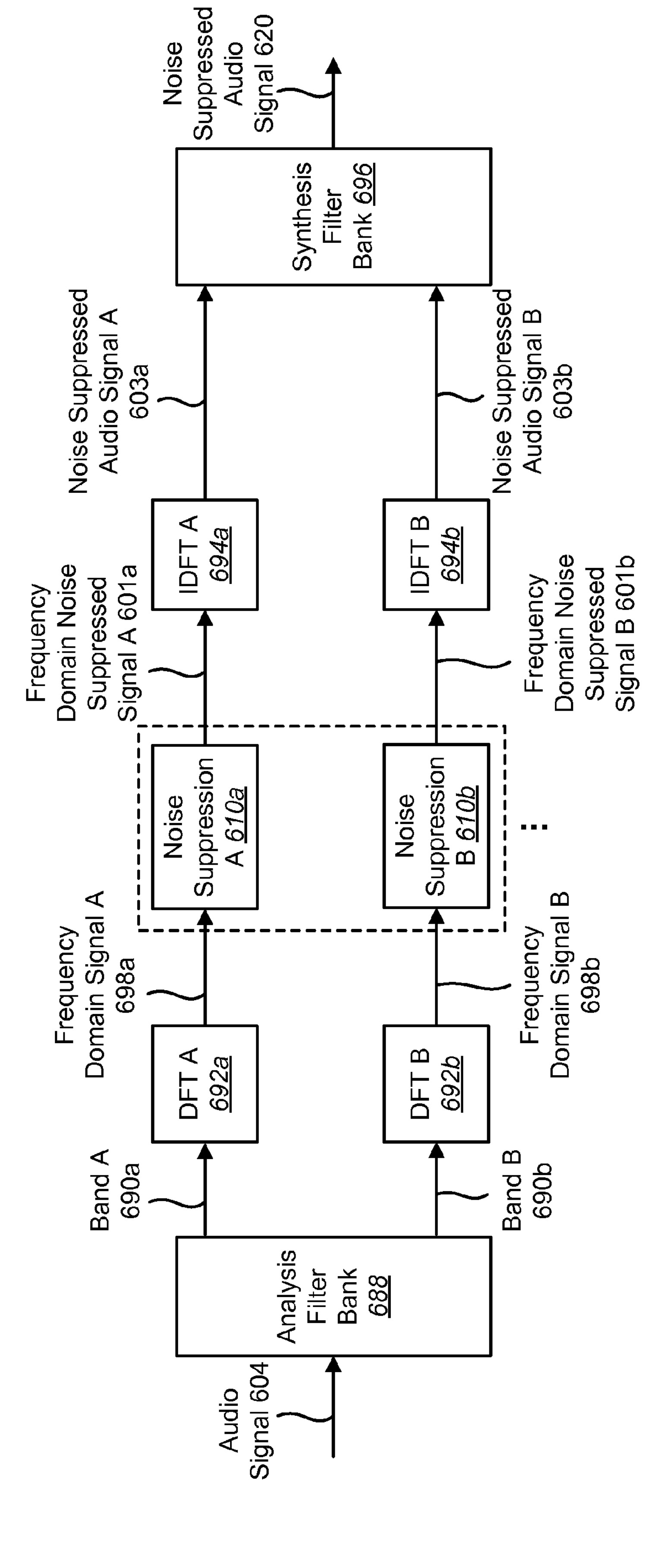
FIG. 6 is a block diagram illustrating noise suppression on multiple bands of an audio signal.

FIG. 6 is a block diagram illustrating noise suppression on multiple bands 690 of an audio signal 604. In general, FIG. 6 illustrates noise suppression 610 being applied to a wideband audio signal 604. In this case, the audio signal 604 is first passed through an analysis filter bank 688 to generate a set of outputs corresponding to different frequency bands 690. Each band 690 is subjected to a separate set of noise suppression 610 (e.g., a separate set of gains is computed for each frequency band 690). The noise suppressed output 603 from each band is then combined using a synthesis filter bank 696 to generate the wideband noise suppressed output signal 620. More detail regarding this procedure is given below.

In one configuration, an audio signal 604 may be split into two or more bands 690 for noise suppression 610. This may be particularly useful when the audio signal 604 is a wideband audio signal 604. An analysis filter bank 688 may be used to split the audio signal 604 into two or more (frequency) bands 690. The analysis filter bank 688 may be implemented as multiple Infinite Impulse Response (IIR) filters, for example. In one configuration, the analysis filter bank 688 splits the audio signal 604 into two bands, band A 690*a* and band B 690*b*. For example, band A 690*a* may be a "high band" that contains higher frequency components than band B 690*b* that contains lower frequency components. Although FIG. 6 illustrates only band A 690*a* and band B 690*b*, in other configurations, the analysis filter bank 688 may split the audio signal 604 into more than two bands 690.

Noise suppression 610 may be performed on each band 690 of the audio signal 604. For example, DFT A 692*a* converts band A 690*a* into the frequency domain to produce frequency domain signal A 698*a*. Noise suppression A 610*a* is then applied to frequency domain signal A 698*a*, producing frequency domain noise suppressed signal A 601*a*. Frequency domain noise suppressed signal A 601*a* may be transformed into noise suppressed signal A 603 (in the time domain) using IDFT A 694*a*.

Similarly, DFT B 692*b* of band B 690*b* may be computed, producing frequency domain signal B 698*b*. Noise suppression B 610*b* is applied to frequency domain signal B 698*b* to produce frequency domain noise suppressed signal B 601*b*. IDFT B 694*b* transforms frequency domain noise suppressed signal B 601*b* into the time domain, resulting in noise suppressed signal B 603*b*. Noise suppressed signals A and B 603*a-b* may then be input into a synthesis filter bank 696. The synthesis filter bank 696 combines or synthesizes noise suppressed signals A and B 603*a-b* into a single noise suppressed audio signal 620.

Figure 7:
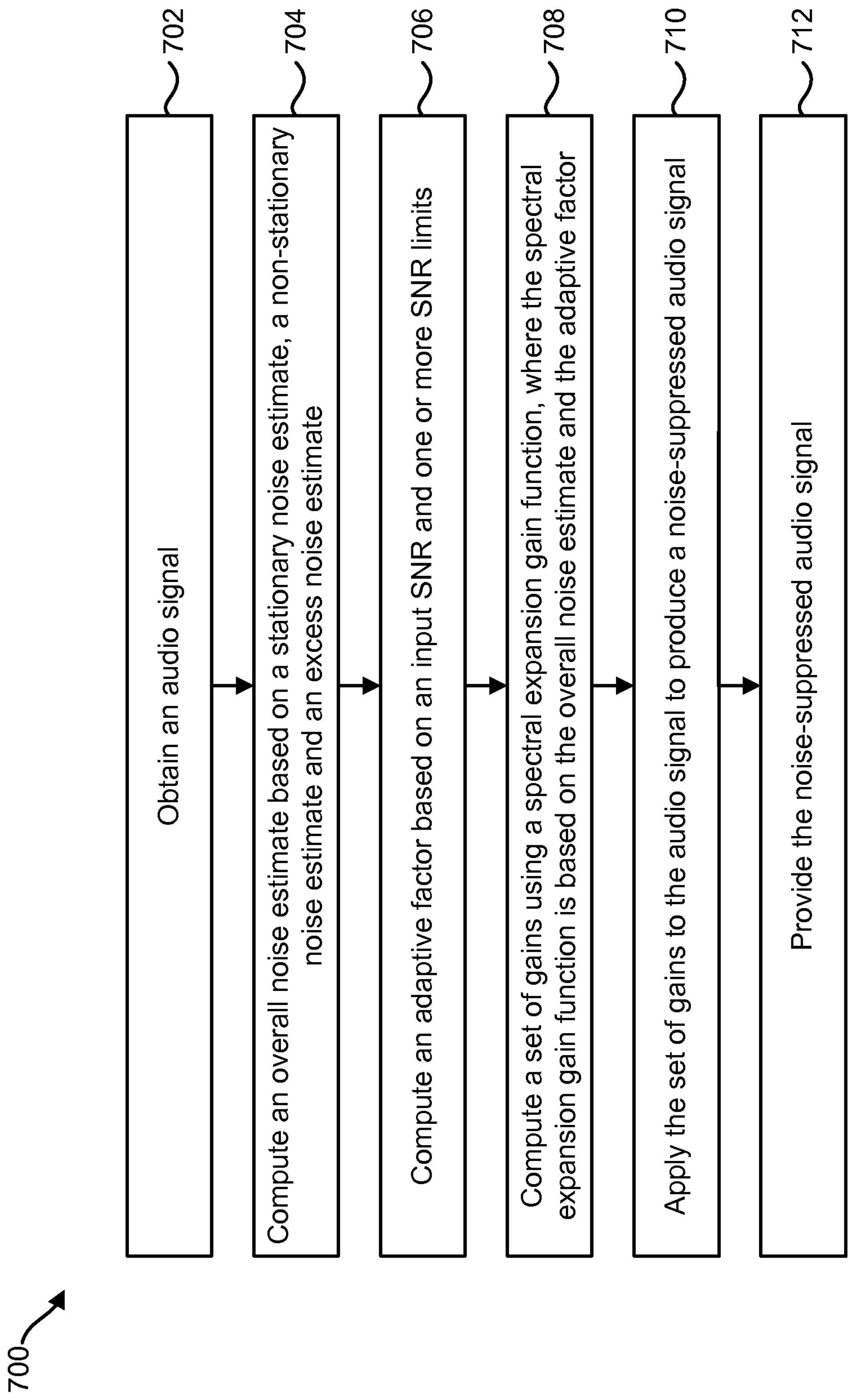
FIG. 7 is a flow diagram illustrating one configuration of a method for suppressing noise in an audio signal.

FIG. 7 is a flow diagram illustrating one configuration of a method 700 for suppressing noise in an audio signal. An electronic device 102 may obtain 702 an audio signal. In one configuration, the electronic device 102 obtains 702 the audio signal using a microphone. In another configuration, the electronic device 102 obtains 702 the audio signal by receiving it from another electronic device (e.g., a wireless communication device, base station, etc.). The electronic device may compute 704 an overall noise estimate based on a stationary noise estimate, a non-stationary noise estimate and an excess noise estimate. More detail on computing the various noise estimates is given below.

The electronic device 102 may also compute 706 an adaptive factor based on an input Signal to Noise Ratio (SNR) and one or more SNR limits. The input SNR may be obtained based on the audio signal, for example. More detail on the input SNR and SNR limits is given below.

The electronic device 102 may compute 708 a set of gains using a spectral expansion gain function. The spectral expansion gain function may be based on the overall noise estimate and/or the adaptive factor. In general, spectral expansion may expand the dynamic range of a signal based on its magnitude (e.g., at a given frequency). The electronic device 102 may apply 710 the set of gains to the audio signal to produce a noise suppressed audio signal. The electronic device 102 may then provide 712 the noise suppressed audio signal. In one configuration, the electronic device provides 712 the noise suppressed audio signal by converting it into an acoustic signal (e.g., using a speaker). In another configuration, the electronic device 102 provides 712 the noise suppressed audio signal by transmitting it to another electronic device (e.g., wireless communication device, base station, etc.). In yet another configuration, the electronic device 102 provides 712 the noise-suppressed audio signal by storing it in memory.

Figure 8:
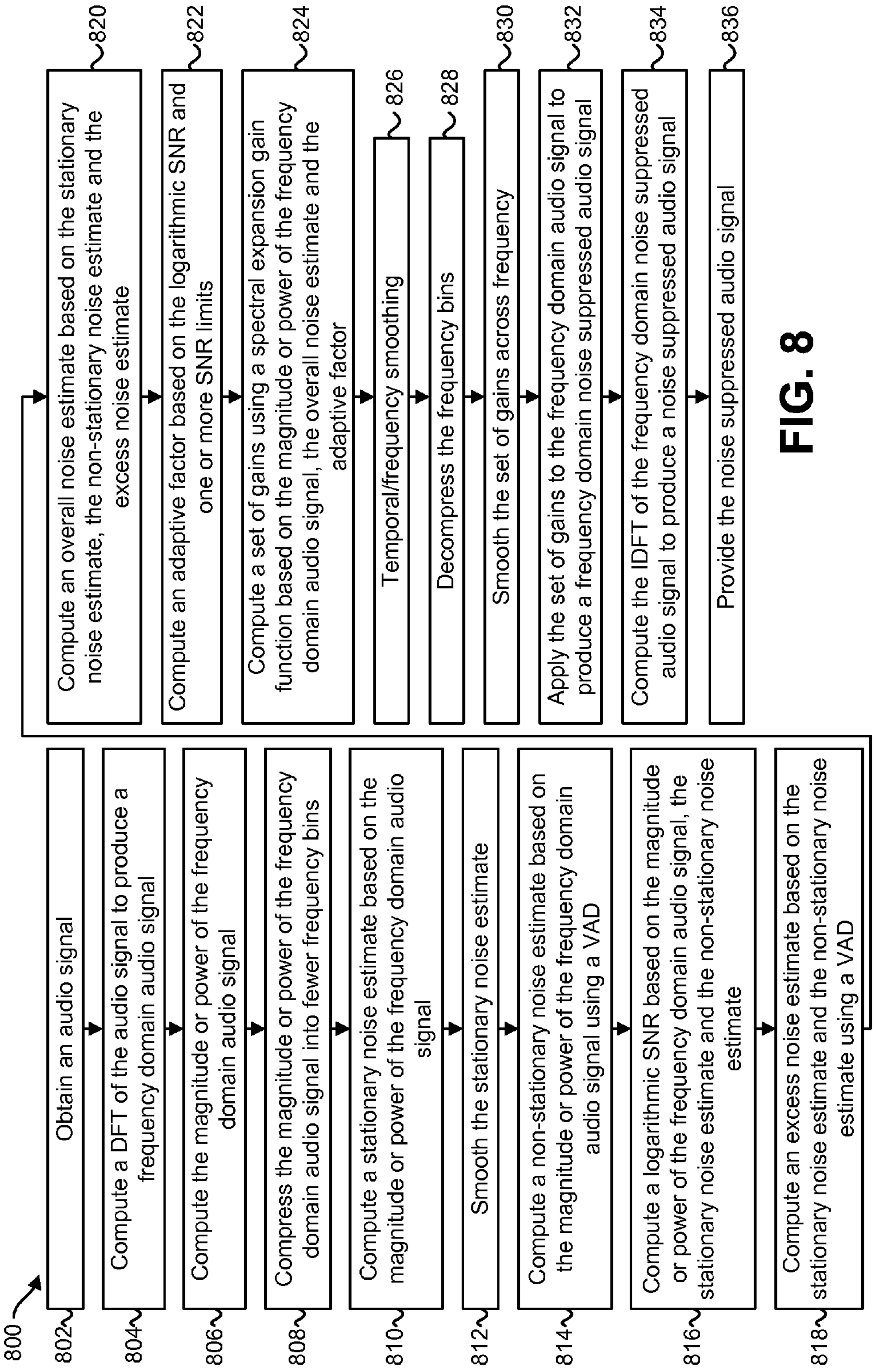
FIG. 8 is a flow diagram illustrating a more specific configuration of a method for suppressing noise in an audio signal.

FIG. 8 is a flow diagram illustrating a more specific configuration of a method 800 for suppressing noise in an audio signal. An electronic device 102 may obtain 802 an audio signal. As discussed above, an electronic device 102 may obtain 802 an audio signal by capturing an audio signal using a microphone or by receiving an audio signal (e.g., from another electronic device). The electronic device 102 may compute 804 a DFT of the audio signal to produce a frequency domain audio signal. For example, the electronic device 102 may use a Fast Fourier Transform (FFT) algorithm to compute 804 the DFT of the audio signal. The electronic device 102 may compute 806 the magnitude or power of the frequency domain audio signal. The electronic device 102 may compress 808 the magnitude or power of the frequency domain audio signal into fewer frequency bins. More detail on this compression 808 is given below.

The electronic device 102 may compute 810 a stationary noise estimate based on the magnitude or power of the frequency domain audio signal. For example, the electronic device 102 may use a minima tracking approach to estimate the stationary noise in the audio signal. Optionally, the stationary noise estimate may be smoothed 812 by the electronic device 102.

The electronic device 102 may compute 814 a non-stationary noise estimate based on the magnitude or power of the frequency domain audio signal using a Voice Activity Detector (VAD). For example, the electronic device 102 may compute a running average of the magnitude or power of the frequency domain audio signal using different smoothing or averaging factors during VAD active periods (e.g., when voice or speech is detected) compared to VAD inactive periods (e.g., when voice or speech is not detected). More specifically, the smoothing factor may be larger when voice is detected than when voice is not detected using the VAD.

The electronic device 102 may compute 816 a logarithmic SNR based on the magnitude or power of the frequency domain audio signal, the stationary noise estimate and the non-stationary noise estimate. For example, the electronic device 102 computes a combined noise estimate based on the stationary noise estimate and the non-stationary noise estimate. The electronic device 102 may take the logarithm of the ratio of the magnitude or power of the frequency domain audio signal to the combined noise estimate to produce the logarithmic SNR.

The electronic device 102 may compute 818 an excess noise estimate based on the stationary noise estimate and the non-stationary noise estimate. For example, the electronic device 102 computes or determines the maximum between zero and the product of a target noise suppression limit and the magnitude or power of the frequency domain audio signal subtracted by the product of a combined noise scaling factor and a combined noise estimate (e.g., based on the stationary and non-stationary noise estimates). Computation 818 of the excess noise estimate may also use a VAD. For example, the excess noise estimate may only be computed when the VAD is inactive (e.g., when no voice or speech is detected). Alternatively or in addition, the excess noise estimate may be multiplied by a scaling or weighting factor that is zero when the VAD is active, and non-zero when the VAD is inactive.

The electronic device 102 may compute 820 an overall noise estimate based on the stationary noise estimate, the non-stationary noise estimate and the excess noise estimate. For example, the overall noise estimate is computed by adding the product of a combined noise estimate (e.g., based on the stationary and non-stationary noise estimates) and a combined noise scaling (or over-subtraction) factor to the product of the excess noise estimate and an excess noise scaling or weighting factor. As discussed above, the excess noise scaling or weighting factor may be zero when the VAD is active and non-zero when the VAD is inactive. Thus, the excess noise estimate may not contribute to the overall noise estimate when the VAD is active.

The electronic device 102 may compute 822 an adaptive factor based on the logarithmic SNR and one or more SNR limits. For example, if the logarithmic SNR is greater than an SNR limit, then the adaptive factor may be computed 822 using the logarithmic SNR and a bias value. If the logarithmic SNR is less than or equal to the SNR limit, then the adaptive factor may be computed 822 based on a noise suppression limit. Furthermore, multiple SNR limits may be used. For example, an SNR limit is a turning point that determines how a gain curve (discussed in more detail below) should behave if the SNR is less than the limit versus more than the limit. In some configurations, multiple turning points or SNR limits may be used such that the adaptive factor (and hence the set of gains) is determined differently for different SNR regions.

The electronic device 102 may compute 824 a set of gains using a spectral expansion gain function based on the magnitude or power of the frequency domain audio signal, the overall noise estimate and the adaptive factor. More detail on the set of gains and the spectral expansion gain function are given below. The electronic device 102 may optionally apply temporal and/or frequency smoothing 826 to the set of gains.

The electronic device 102 may decompress 828 the frequency bins. For example, the electronic device 102 may interpolate the compressed frequency bins. In one configuration, the same compressed gain is used for all frequencies corresponding to a compressed frequency bin. The electronic device may optionally smooth 830 the (decompressed) set of gains across frequencies to reduce discontinuities.

The electronic device 102 may apply 832 the set of gains to the frequency domain audio signal to produce a frequency domain noise suppressed audio signal. For example, the electronic device 102 may multiply the frequency domain audio signal by the set of gains. The electronic device 102 may then compute 834 the IDFT (e.g., an Inverse Fast Fourier Transform (IFFT)) of the frequency domain noise suppressed audio signal to produce a noise suppressed audio signal (in the time domain). The electronic device 102 may provide 836 the noise suppressed audio signal. For example, the electronic device 102 may transmit the noise suppressed audio signal to another electronic device such as a base station or wireless communication device. Alternatively, the electronic device 102 may provide 836 the noise suppressed audio signal by converting the noise suppressed audio signal to an acoustic signal (e.g., outputting the noise suppressed audio signal using a speaker). The electronic device may additionally or alternatively provide 836 the noise suppressed audio signal by storing it in memory.

Figure 9:
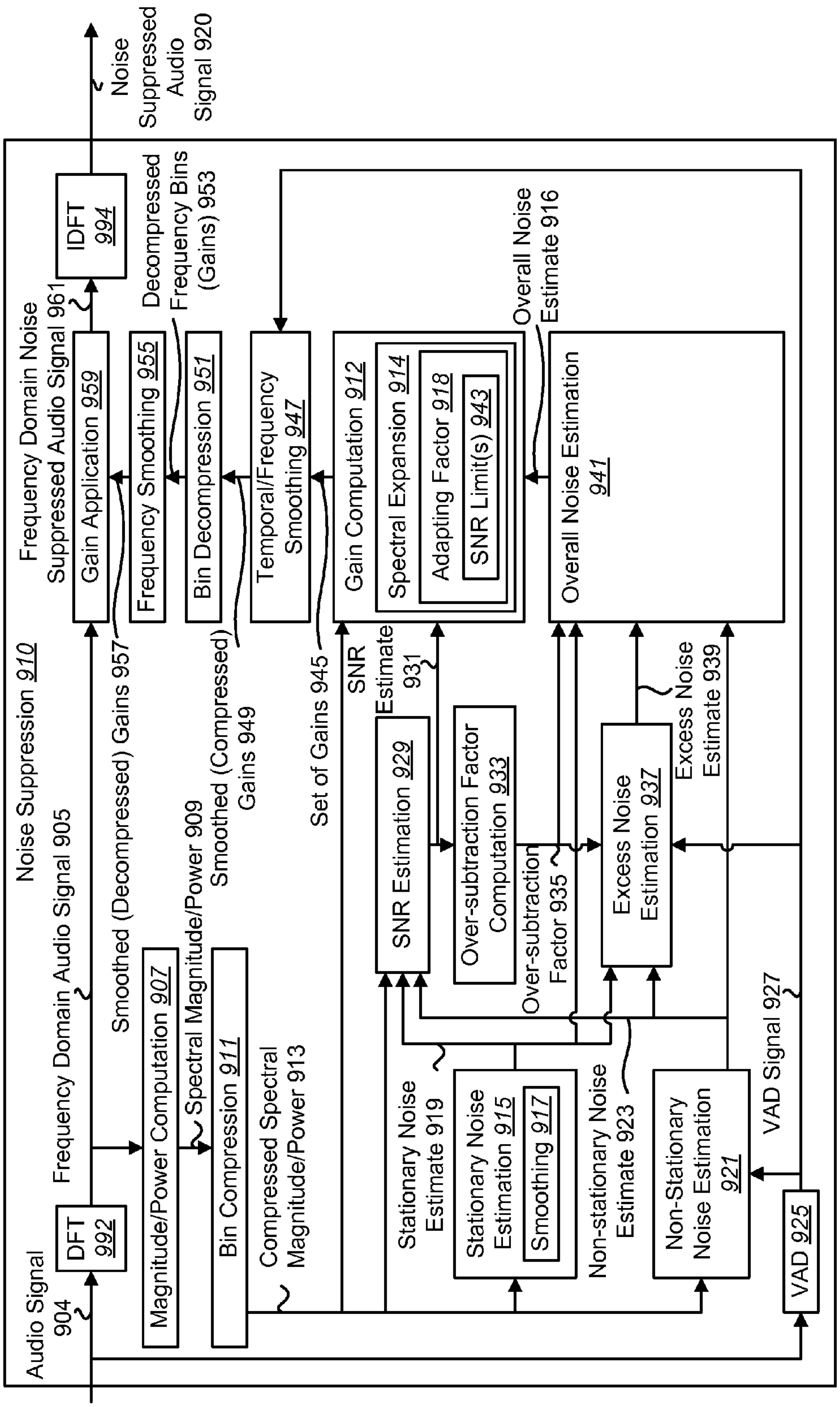
FIG. 9 is a block diagram illustrating one configuration of a noise suppression module.

FIG. 9 is a block diagram illustrating one configuration of a noise suppression module 910. A more general explanation of the noise suppression module 910 is given in connection with FIG. 9. More detail regarding possible implementations or functions included in the noise suppression module 910 is given hereafter. It should be noted that the noise suppression module 910 may be implemented in hardware, software, or a combination of both.

The noise suppression module 910 employs frequency domain noise suppression techniques to improve the quality of audio signals 904. The audio signal 904 is first transformed into a frequency domain audio signal 905 by applying a DFT (e.g., FFT) 992 operation. Spectral magnitude or power estimates 909 may be computed by the magnitude/power computation module 907. For example, an absolute power of the frequency domain audio signal 905 is computed and then the square-root of the absolute power is computed to produce the spectral magnitude estimates 909 of the audio signal 904.

More specifically, let X(n,f) represent the frequency domain audio signal 905 (e.g., the complex DFT or FFT 992 of the audio signal 904) at a time frame n and a frequency bin f. The input audio signal 904 may be segmented into frames or blocks of length N. For example, N=10 milliseconds (ms) or 20 ms, etc. The DFT 992 operation may be performed by taking, for example, a 128 point or 256 point FFT of the audio signal 904 to transform it 904 into the frequency domain and produce the frequency domain audio signal 905.

An estimate of the instantaneous power spectrum P(n,f) 909 of the input audio signal 904 at time frame n and frequency bin f is illustrated in Equation (1).

$$P(n,f)=|X(n,f)|^2 \quad (1)$$

A magnitude spectral estimate S(n,f) 909 of the audio signal 904 may be computed by taking the square-root of the power spectral estimate P(n,f) as illustrated in Equation (2).

$$S(n,f)=|X(n,f)| \quad (2)$$

The noise suppression module 910 may operate on the magnitude spectral estimate S(n,f) 909 of the audio signal 904 (e.g., of the frequency domain audio signal X(n,f)). Alternatively, the noise suppression module 910 may operate directly on the power spectral estimate P(n,f) 909 or any other power of the power spectral estimate P(n,f). In other words, the noise suppression module 910 may use the spectral magnitude or power 909 estimates to operate.

The spectral estimates 909 may be compressed to reduce the number of frequency bins to fewer bins. That is, the bin compression module 911 may compress the spectral magnitude/power estimates 909 to produce compressed spectral magnitude/power estimates 913. This may be done on a logarithmic scale (e.g., not exactly Bark scale). Since bands of hearing increase logarithmically across frequencies, the spectral compression can be done in a simple manner by logarithmically compressing 911 the spectral magnitude estimate or data 909 across frequencies. Compressing the spectral magnitude/power 909 into fewer frequency bins may reduce computation complexity. However, it should be noted that frequency bin compression 911 is optional and the noise suppression module 910 may operate using uncompressed spectral magnitude/power estimate(s) 909.

From the spectral magnitude estimates 909 or compressed spectral magnitude estimates 913, three types of noise spectral estimates may be computed: stationary noise estimates 919, non-stationary noise estimates 923 and excess noise estimates 939. For example, the stationary noise estimation module 915 uses the compressed spectral magnitude 913 to generate a stationary noise estimate 919. The stationary noise estimate 919 may optionally be smoothed using smoothing 917.

The non-stationary noise estimate 923 and the excess noise estimate 939 may be computed by employing a detector 925 for detecting the presence of the desired signal. For example, the desired signal need not be voice, and other types of detectors 925 besides Voice Activity Detectors (VADs) may be used. In the case of voice communication systems, a VAD 925 is employed for detecting voice or speech. For example, the non-stationary noise estimation module 921 uses the compressed spectral magnitude 913 and a VAD signal 927 to compute the non-stationary noise estimate 923. The VAD 925 may be, for example, a time-domain single-microphone VAD as used in browsetalk mode.

The stationary 919 and non-stationary 923 noise estimates may be used by the SNR estimation module 929 to compute the SNR estimate 931 (e.g., a logarithmic SNR 931) of the spectral magnitude/power 909 or the compressed spectral magnitude/power 913. The SNR estimates 931 may be used by the over-subtraction factor computation module 933 to compute aggressiveness or over-subtraction factors 935. The over-subtraction factor 935, the stationary noise estimate 919, the non-stationary noise estimate 923 and the VAD signal 927 may be used by the excess noise estimation module 937 to compute an excess noise estimate 939.

The stationary noise estimate 919, the non-stationary noise estimate 923 and the excess noise estimate 939 may be combined intelligently to form an overall noise estimate 916. In other words, the overall noise estimate 916 may be computed by the overall noise estimation module 941 based on the stationary noise estimate 919, the non-stationary noise estimate 923 and the excess noise estimate 939. The over-subtraction factor 935 may also be used in the computation of the overall noise estimate 916.

The overall noise estimates 916 may be used in speech adaptive 918 spectral expansion 914 (e.g., companding) based gain computations 912. For example, the gain computation module 912 may include a spectral expansion function 914. The spectral expansion function 914 may use an adaptive factor 918. The adaptive factor 918 may be computed using one or more SNR limits 943 and an SNR estimate 931. The gain computation module 912 may compute a set of gains 945 using the spectral expansion function, the compressed spectral magnitude 913 and the overall noise estimate 916.

The set of gains 945 may optionally be smoothed to reduce discontinuities caused by rapid variation of the gains 945 across time and frequency. For example, a temporal/frequency smoothing module 947 may optionally smooth the set of gains 945 across time and/or frequency to produce smoothed (compressed) gains 949. In one configuration, the temporal smoothing module 947 may use exponential averaging (e.g., IIR gain smoothing) across time or frames to reduce variations as illustrated in Equation (3).

$$\overline{G}(n,k)=\alpha_t\overline{G}(n-1,k)+(1-\alpha_t)G(n,k) \quad (3)$$

In Equation (3), G(n,k) is the set of gains 945, where n is the frame number and k is the frequency bin number. Furthermore, $\overline{G}(n,k)$ is a temporally smoothed set of gains and $\alpha_t$ is a smoothing constant.

If the desired signal is voice, it may be beneficial to determine the smoothing constant $\alpha_t$ based on the VAD 925 decision. For example, when speech or voice is detected, the gain may be allowed to change rapidly to preserve speech and reduce artifacts. In the case where speech or voice is detected, the smoothing constant may be set within the range $0<\alpha_t\leq 0.6$. For noise-only periods (e.g., when no speech or voice is detected), the gain may be smoothed more with the smoothing constant in the range $0.5<\alpha_t\leq 1$. This may improve the quality of the noise residual during noise-only periods. Additionally, the smoothing constant $\alpha_t$ may also be changed based on attack and release times. If the gain 945 rises suddenly, the smoothing constant $\alpha_t$ may be lowered to allow faster tracking If the gain 945 falls, the smoothing constant $\alpha_t$ may be increased, allowing the gain to fall down slowly. This may provide better preservation of speech or voice during speech or voice active periods.

The set of gains 945 may additionally or alternatively be smoothed across frequencies to reduce the gain discontinuity across frequencies. One approach to frequency smoothing is to apply a Finite Impulse Response (FIR) filter on the gain across frequencies as illustrated in Equation (4).

$$\overline{G}_f(n,k)=\sum_m \alpha_f(m)\overline{G}(n,k-m) \quad (4)$$

In Equation (4), $\alpha_f$ is a smoothing factor and $\overline{G}_f(n,k)$ is the set of gains that is smoothed in frequency. The smoothening filter may be, for example, a symmetric three tap filter such as [1−2*a,a,1−2*a], where smaller a values provide higher smoothing and larger a values provide coarser smoothing. Additionally, the smoothing constant a may be frequency dependent, such that lower frequencies are smoothed coarsely and higher frequency are smoothed higher. For example, a=0.9 for 0-1000 Hz, a=0.8 for 1000-2000 Hz, a=0.7 for 2000-4000 Hz and a=0.6 for higher frequencies. Thus, the set of gains 945 may be optionally smoothed in time and/or frequency to produce the smoothed (compressed) gains 949. Another example of FIR gain smoothing across frequencies is illustrated in Equation (5).

$$\overline{G}(n,k)=\alpha_{f1}G(n,k-1)+(1-2*\alpha_{f1})G(n,k)+\alpha_{f1}G(n,k+1) \quad (5)$$

It should be noted that although the output of the temporal/frequency smoothing module 947 is deemed "smoothed (compressed) gains" 949 for convenience, the temporal/frequency smoothing module 947 may operate on uncompressed gains and produce uncompressed smoothed gains 949.

The set of gains 945 or smoothed (compressed) gains 949 may be input into a bin decompression module 951 to decompress the gains, thereby producing a set of decompressed gains 953 (e.g., in a decompressed number of frequency bins). That is, the computed set of gains 945 or smoothed gains 949 may be spectrally decompressed 951 to produce decompressed gains 953 for the original set of frequencies (e.g., from fewer frequency bins to the number of original frequency bins before bin compression 911). This can be done using interpolation techniques. One example with zeroth-order interpolation involves using the same compressed gain for all frequencies corresponding to that compressed bin and is illustrated in Equation (6).

$$\overline{G}_f(n,f)=\overline{G}_f(n,k)f_{k-1}<f<f_k \quad (6)$$

In Equation (6), n is the frame number and k is the bin number. Furthermore, $\overline{G}_f(n,f)$ is the decompressed or interpolated set of gains, where an optionally smoothed gain $\overline{G}_f(n,k)$ 945, 949 is applied to all frequencies f between $f_{k-1}$ and $f_k$. As frequency bin compression 911 is optional, frequency bin decompression 951 is also optional.

Optional frequency smoothing 955 may be applied to the decompressed set of gains (e.g., $\overline{G}_f$) 953 to produce smoothed (decompressed) gains 957. Frequency smoothing 955 may reduce discontinuities. The frequency smoothing module 955 may smooth the set of gains 945, 949, 953 to produce frequency smoothed gains 957 as illustrated in Equation (7).

$$\overline{G}_{f0}(n,f)=\sum_{f_m}\alpha_{f0}(m)\overline{G}_f(n,f-f_m) \quad (7)$$

In Equation (7), $\overline{G}_{f0}(n,f)$ denotes the smoothed set of gains, $\alpha_{f0}$ is a smoothing or averaging factor, and m is a decompressed bin number. It should be noted that frequency smoothing 955 may be applied to smooth a set of gains 945, 949 that has not be compressed and/or decompressed.

The set of gains (e.g., smoothed (decompressed) gains 957, decompressed gains 953, smoothed gains 949 (without bin compression 911) or gains 945 (without bin compression 911)) may be applied to the frequency domain audio signal 905 by the gain application module 959. For example, the smoothened gains $\overline{G}_{f0}(n,f)$ 957 may be multiplied with the frequency domain audio signal 905 (e.g., the complex FFT of the input data) to get the frequency domain noise suppressed audio signal 961 (e.g., the noise suppressed FFT data) as illustrated in Equation (8).

$$Y(n,f)=\overline{G}_{f0}(n,f)X(n,f) \quad (8)$$

In Equation (8), Y(n,f) is the frequency domain noise suppressed audio signal 961 and X(n,f) is the frequency domain audio signal 905. The frequency domain noise suppressed audio signal 961 may be subjected to an IDFT (e.g., inverse FFT or IFFT) 994 to produce the noise suppressed audio signal 920 (e.g., in the time-domain).

In summary, the systems and methods disclosed herein may involve computing noise level estimates 915, 921, 937, 941 at different frequencies and computing a set of gains 945 from the input spectral magnitude data 909, 913 to suppress noise in the audio signal 904. The systems and methods disclosed herein may be used, for example, as a single-microphone noise suppressor or front-end noise suppressor for various applications such as audio/voice recording and voice communications.

Figure 10:
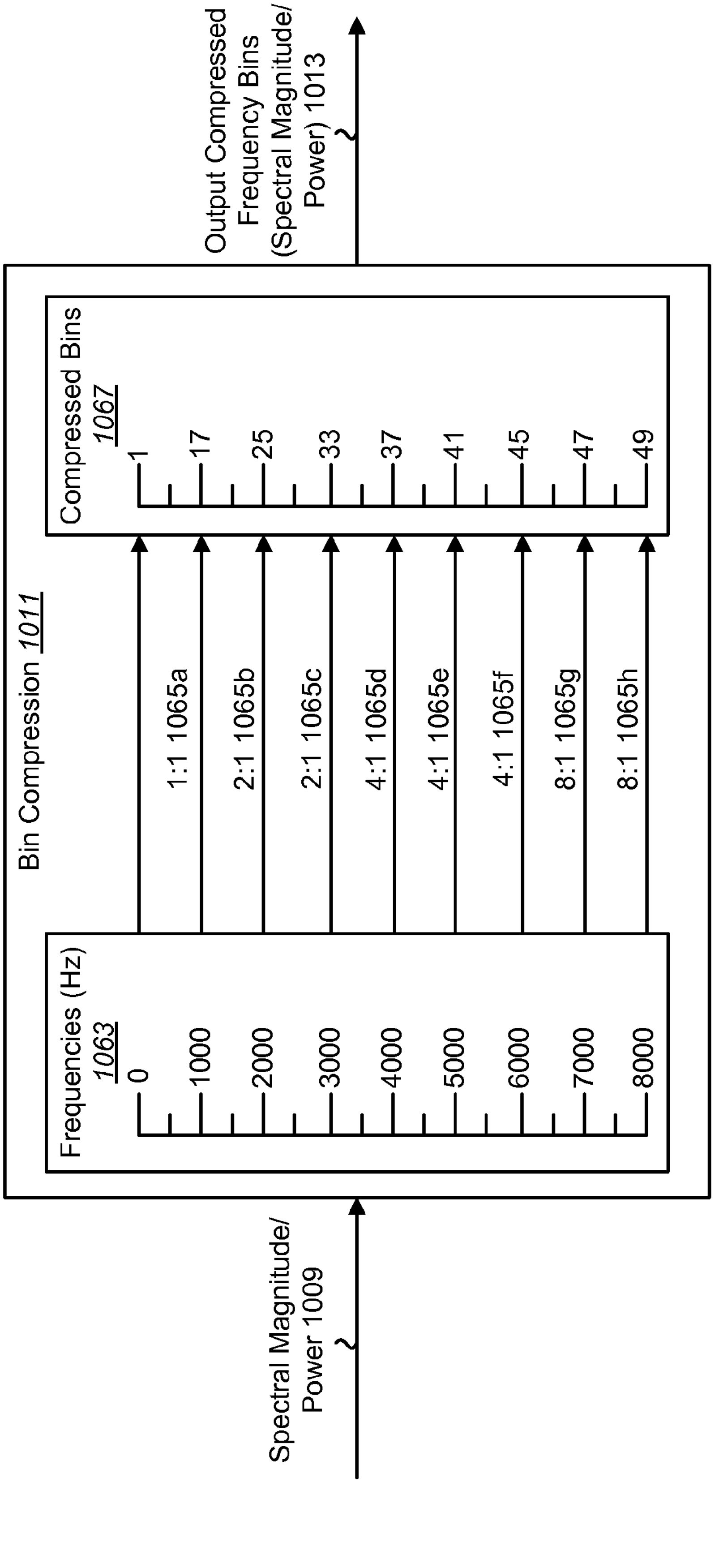
FIG. 10 is a block diagram illustrating one example of bin compression.

FIG. 10 is a block diagram illustrating one example of bin compression 1011. The bin compression module 1011 may receive a spectral magnitude/power signal 1009 in a number of frequency "bins" and compress it into fewer compressed frequency bins 1067. The compressed frequency bins 1067 may be output as output compressed frequency bins 1013. As described above, bin compression 1011 may reduce computational complexity in performing noise suppression 910.

In general, let the DFT 992 (e.g., FFT) length be denoted by $N_f$. For example, $N_f$ may be 128 or 256, etc. for voice applications. The spectral magnitude data 1009 across $N_f$ frequency bins is compressed to occupy a set of fewer bins by averaging the spectral magnitude data 1009 across adjacent frequency bins.

An example of the mapping from an original set of frequencies 1063 to a compressed set of frequencies (bins) 1067 is shown in FIG. 10. In this example, the data in lower frequencies (under 1000 Hertz (Hz)) are preserved to provide high resolution processing for low frequencies. For higher frequencies, adjacent frequency bin data may be averaged with adjacent bins to provide smoother spectral estimates. The example illustrated in FIG. 10 shows uncompressed frequency bins that are compressed into the compressed bins 1067 according to frequency 1063. For example, 128 frequency bins or data points in the spectral magnitude estimate 1009 may be compressed into 48 compressed frequency bins 1067 according to the compression illustrated. The compression 1011 may be accomplished through mapping and/or averaging. More specifically, each of the frequency bins 1063 between 0-1000 Hz are mapped 1:1 1065*a* into compressed frequency bins 1067. Thus, frequency bins 1-16 become compressed frequency bins 1-16. Between 1000 Hz and 2000 Hz, each two of frequency bins 17-32 are averaged and mapped 2:1 1065*b* into compressed frequency bins 1067 17-24. Similarly, between 2000 Hz and 3000 Hz, frequency bins 33-48 are averaged and mapped 2:1 1065*c* into compressed frequency bins 1067 25-32. Between 3000 Hz and 4000 Hz, each four of frequency bins 49-64 are averaged and mapped 4:1 1065*d* into compressed frequency bins 1067 33-36. Similarly, bins 65-80 become compressed bins 37-40 and bins 81-96 become compressed bins 41-44 for 4000-5000 Hz and 5000-6000 Hz in a 4:1 1065*e-f* compression, respectively. For 6000-7000 Hz, bins 97-112 become compressed bins 45-46 and for 7000-8000 Hz and bins 113-128 become compressed bins 47-48 in an 8:1 1065*g-h* compression, respectively.

In general, let k denote the compressed frequency bin 1067. The spectral magnitude data in a compressed frequency bin A(n,k) 1067 may be computed according to Equation (9).

$$A(n,k)=\frac{1}{N_k}\sum_{f=f_{k-1}}^{f_k}S(n,f) \quad (9)$$

In Equation (9), f denotes frequency and $N_k$ is the number of linear frequency bins in the compressed bin k. This averaging may loosely simulate the auditory processing in human hearing. That is, the auditory processing filters in human cochlea may be modeled as a set of band pass filters whose bandwidths increase progressively with the frequency. The bandwidths of the filters are often referred to as the "critical bands" of hearing. Spectral compression of the input data 1009 may also help in reducing the variance of the input spectral estimates by averaging. It may also help in reducing the computational burden of the noise suppression 910 algorithm. It should be noted that the particular type of averaging used to compress the spectral data may not be important. Thus, the systems and methods herein are not restricted to any particular kind of spectral compression.

Figure 11:
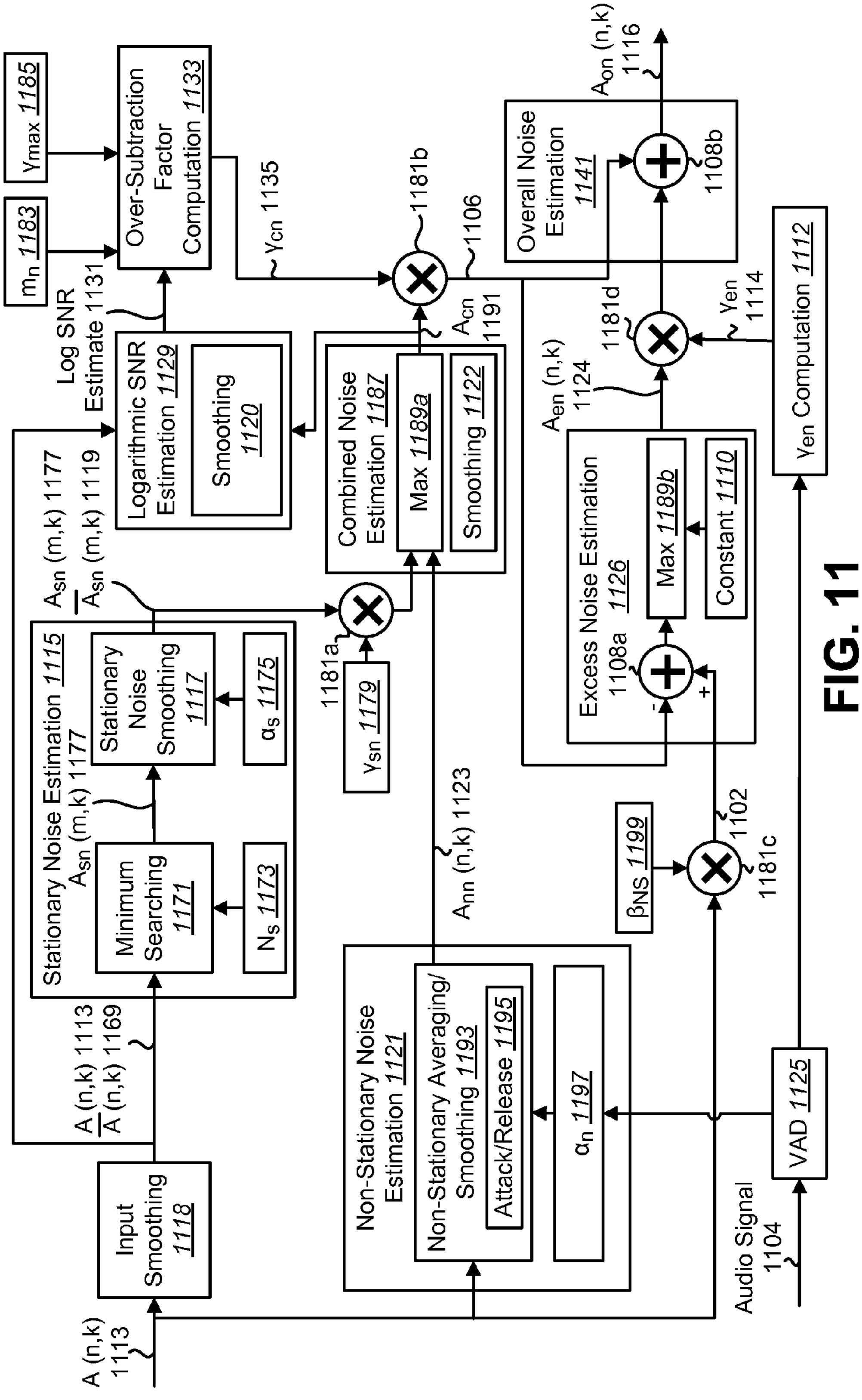
FIG. 11 is a block diagram illustrating a more specific implementation of computing an excess noise estimate and an overall noise estimate according to the systems and methods disclosed herein.

FIG. 11 is a block diagram illustrating a more specific implementation of computing an excess noise estimate and an overall noise estimate according to the systems and methods disclosed herein. Noise suppression algorithms may require an estimate of the noise in the input signal in order to suppress it. Noise in an input signal can be classified into stationary and non-stationary noise categories. If the noise statistics remains stationary across time, the noise is classified as stationary noise. Examples of stationary noise include engine noise, motor noise, thermal noise, etc. The statistical properties of non-stationary noise vary with time. According to the systems and methods disclosed herein, stationary and non-stationary noise components may be estimated separately and combined to form an overall noise estimate.

In the implementation illustrated in FIG. 11, an electronic device 102 computes a stationary noise estimate from the input signal 1104. This may be accomplished in several ways. For example, stationary noise may be computed by a stationary noise estimation module 1115 using a minimum statistics approach. In this approach, the spectral magnitude data A(n, k) 1113 (which may or may not be compressed) is segmented into periods of length $N_s$ 1173 (e.g., $N_s$=1 second) and the minimum spectral magnitude during this period is searched and determined by the minimum searching module 1171. The minimum searching 1171 is repeated in each period to determine a stationary noise floor estimate $A_{sn}$(m,k) 1177. Thus, the stationary noise estimate $A_{sn}$(m,k) 1177 may be determined according to Equation (10).

$$A_{sn}(m,k) = \min_{(m-1)N_S \le mN_S} \{A(n,k)\} \quad (10)$$

In Equation (10), m is a stationary noise searching block index, n is the sample index inside a block, k is the frequency bin number and A(n,k) 1113 is the spectral magnitude estimate at sample n and bin k. According to Equation (10), the minimum searching 1171 is done over a block of $N_s$ 1173 samples and updated in $A_{sn}$(m,k) 1177. As an alternative, the time segment $N_s$ 1173 may be broken down into a few sub-windows. First, the minima in each sub-window may be computed. Then, the overall minima for the entire time segment $N_s$ 1173 may be determined. This approach enables updating the stationary noise floor estimate $A_{sn}$(m,k) 1177 in shorter intervals (e.g., every sub-window) and may thus have faster tracking capabilities. For example, tracking the power of the spectral magnitude estimate 1113 can be implemented with a sliding window. In the sliding window implementation, the overall duration of an estimate period of T seconds may be divided into a number $n_{ss}$ of subsections, each subsection having a time duration of $T/n_{ss}$ seconds. In this way, the stationary noise estimate $A_{sn}$(m,k) 1177 may be updated every $T/n_{ss}$ seconds instead of every T seconds.

Optionally, the input magnitude estimate A(n,k) 1113 may be smoothed in time by an input smoothing module 1118 before stationary noise floor estimation 1115. That is, the spectral magnitude estimate A(n,k) 1113 or a smoothed spectral magnitude estimate $\bar{A}$(n,k) 1169 may be input into the stationary noise estimation module 1115. The stationary noise floor estimate $A_{sn}$(m,k) 1177 may also be optionally smoothed across time by a stationary noise smoothing module 1117 to reduce the variance of the estimation as illustrated in Equation (11).

$$\bar{A}_{sn}(m,k)=\alpha_s\bar{A}_{sn}(m-1,k)+(1-\alpha_s)A_{sn}(m,k) \quad (11)$$

In Equation (11), $\alpha_s$ 1175 is a stationary noise smoothing or averaging factor and $\bar{A}_{sn}$(m, k) 1119 is the smoothed stationary noise estimate. $\alpha_s$ 1175 may, for example, be set to a value between 0.5 and 0.8 (e.g., 0.7). In summary, the stationary noise estimate module 1115 may output a stationary noise estimate $A_{sn}$(m,k) 1177 or an optionally smoothed stationary noise estimate $\bar{A}^{sn}$(m,k) 1119.

The stationary noise estimate $A_{sn}$(m,k) 1177 (or an optionally smoothed stationary noise estimate 1119) may under-estimate the noise level due to the nature of minima tracking. In order to compensate for this under-estimation, the stationary noise estimate 1177, 1119 may be scaled by a stationary noise scaling or weighting factor $\gamma_{sn}$ 1179. The stationary noise scaling or weighting factor $\gamma_{sn}$ 1179 may be used to scale the stationary noise estimate 1177, 1119 (through multiplication 1181*a*) by greater than 1 before using it for noise suppression. For example, the stationary noise scaling factor $\gamma_{sn}$ 1179 may be 1.25, 1.4 or 1.5, etc.

The electronic device 102 also computes a non-stationary noise estimate $A_{nn}$(n,k) 1123. The non-stationary noise estimate $A_{nn}$(n,k) 1123 may be computed by a non-stationary noise estimation module 1121. Stationary noise estimation techniques may effectively capture the level of only monotonous noises such as engine noise, motor noise, etc. However, they often do not effectively capture noises such as babble noise. Better noise estimation may be done by using a detector 1125. For voice communications, the desired signal is speech or voice. A voice activity detector (VAD) 1125 can be employed to identify portions of the input audio signal 1104 that contain speech or voice and the other portions that contain noise only. Using this information, a noise estimate that is capable of faster noise tracking may be computed.

For example, the non-stationary averaging/smoothing module 1193 computes a running average of the input spectral magnitude A(n, k) 1113 with different smoothing factors $\alpha_n$ 1197 during VAD 1125 active and inactive periods. This approach is illustrated in Equation (12).

$$A_{nn}(n,k)=\alpha_n A_{nn}(n-1,k)+(1-\alpha_n)A(n,k) \quad (12)$$

In Equation (12), $\alpha_n$ 1197 is a non-stationary smoothing or averaging factor. Additionally or alternatively, the stationary noise estimate $A_{sn}$(m,k) 1177 may be subtracted from the non-stationary noise estimate $A_{nn}$(n,k) 1123 such that noise power levels are not overestimated for the gain calculation.

The smoothing factor $\alpha_n$ 1197 may be chosen to be large when the VAD 1125 is active (e.g., indicating voice/speech) and smaller when the VAD 1125 is inactive (e.g., indicating no speech/voice). For example, $\alpha_n$=0.9 when the VAD 1125 is inactive and $\alpha_n$=0.9999 when the VAD 1125 is active (with large signal power). Furthermore, the smoothing factor 1197 may be set to update the non-stationary noise estimate 1123 slowly during active speech periods with small signal power (e.g., $\alpha_n$=0.999). This allows faster tracking of noise variations during noise-only periods. This may also reduce capturing the desired signal in the non-stationary noise estimate $A_{nn}$(n,k) 1123 when the VAD 1125 is active. The smoothing factor $\alpha_n$ 1197 may be set to a relatively high value (e.g., close to 1) such that $A_{nn}$(n,k) 1123 may be deemed a "long-term" non-stationary noise estimate. That is, with the non-stationary noise averaging factor $\alpha_n$ 1197 set high, $A_{nn}$(n,k) 1123 may vary slowly over a relatively long term.

The non-stationary smoothing 1193 can also be made more sophisticated by incorporating attack and release times 1195 into the averaging procedure. For example, if the input rises high suddenly, the averaging factor $\alpha_n$ 1197 is increased to a high value to prevent a sudden rise in the non-stationary noise level estimate $A_{nn}$(n,k) 1123, as the sudden rise could be due to the presence of speech or voice. If the input falls down compared to the non-stationary noise estimate $A_{nn}$(n,k) 1123, the averaging factor $\alpha_n$ 1197 may be lowered to allow faster tracking of noise variations.

The electronic device 102 may intelligently combine the stationary noise estimate 1177, 1119 and non-stationary noise estimate $A_{nn}$(n,k) 1123 to produce a combined noise estimate $A_{cn}$(n,k) 1191 that can be used for noise suppression. That is, the combined noise estimate $A_{cn}$(n,k) 1191 may be computed using a combined noise estimation module 1187. For example, one combination approach weights the two noise estimates 1119, 1123 and sums them to get a combined noise estimate $A_{cn}$(n,k) 1191 as illustrated in Equation (13).

$$A_{cn}(n,k)=\gamma_{sn}\bar{A}_{sn}(m,k)+\gamma_{nn}A_{nn}(n,k) \quad (13)$$

In Equation (13), $\gamma_{nn}$ is a non-stationary noise scaling or weighting factor (not shown in FIG. 11). The non-stationary noise estimate $A_{nn}$(n,k) 1123 may already include the stationary noise estimate 1177. Thus, this approach could unnecessarily overestimate the noise levels. Alternatively, the combined noise estimate $A_{cn}(n,k)$ 1191 may be determined as illustrated in Equation (14).

$$A_{cn}(n,k)=\max\{\gamma_{sn}\bar{A}_{sn}(m,k)A_{nn}(n,k)\} \quad (14)$$

In Equation (14), the scaling or over-subtraction factor $\gamma_{sn}$ 1179 may be used to scale up the stationary noise estimate 1177, 1119 before finding the maximum 1189*a* of the stationary noise estimate 1177, 1119 and the non-stationary noise estimate $A_{nn}(n,k)$ 1123. The stationary noise scaling or over-subtraction factor $\gamma_{sn}$ 1179 may be configured as a tuning parameter and set to 2 by default. Optionally, the combined noise estimate $A_{cn}(n,k)$ 1191 may be smoothed using smoothing 1122 (e.g., before being used to determine a LogSNR 1131).

Additionally, the combined noise estimate $A_{cn}(n,k)$ 1191 may be scaled further to improve the noise suppression performance. The combined noise estimate scaling factor $\gamma_{cn}$ 1135 (also referred to as the over-subtraction factor or overall noise over-subtraction factor) can be determined by the over-subtraction factor computation module 1133 based on the signal to noise ratio (SNR) of the input audio signal 1104. The logarithmic SNR estimation module 1129 may determine a logarithmic SNR estimate (referred to as LogSNR 1131 for convenience) based on the input spectral magnitude A(n,k) 1113 and the combined noise estimate $A_{cn}(n,k)$ 1191 as illustrated in Equation (15).

$$LogSNR = 20*\log_{10}\left\{\frac{A(n,k)}{A_{cn}(n,k)}\right\} \quad (15)$$

Alternatively, the LogSNR 1131 may be computed according to Equation (16).

$$LogSNR = 10*\log_{10}\left\{\frac{\bar{A}(n,k)}{A_{nn}(n,k)}\right\} \quad (16)$$

Optionally, the LogSNR 1131 may be smoothed 1120 before being used to determine the combined noise scaling, over-subtraction or weighting factor $\gamma_{cn}$ 1135. The combined noise scaling or over-subtraction factor $\gamma_{cn}$ 1135 may be chosen such that if the SNR is low, the combined noise scaling factor $\gamma_{cn}$ 1135 is set to a high value to remove more noise. And, if the SNR is high, the combined noise scaling or over-subtraction factor $\gamma_{cn}$ 1135 is set close to unity so as to remove less noise and preserve more speech or voice in the output. One example of an equation for determining the combined noise scaling factor $\gamma_{cn}$ 1135 as a function of LogSNR 1131 is illustrated in Equation (17).

$$\gamma_{cn}=\gamma_{max}-m_n\text{LogSNR} \quad (17)$$

In Equation (17), the LogSNR 1131 may be restricted to be within a range of values between a minimum value (e.g., 0 dB) and a maximum value (e.g., 20 dB). Furthermore, $\gamma_{max}$ 1185 may be the maximum scaling or weighting factor used when the LogSNR 1131 is 0 dB or less. $m_n$ 1183 is a slope factor that decides how much $\gamma_{cn}$ 1135 varies with the LogSNR 1131.

Noise estimation may be further improved by using an excess noise estimate $A_{en}(n,k)$ 1124 when the VAD 1125 is inactive. For example, if 20 dB noise suppression is desired in the output, the noise suppression algorithm may not always be able to achieve this level of suppression. Using the excess noise estimate $A_{en}(n,k)$ 1124 may help improve the noise suppression and achieve this desired target noise suppression goal. The excess noise estimate $A_{en}(n,k)$ 1124 may be computed by the excess noise estimation module 1126 as illustrated in Equation (18).

$$A_{en}(n,k)=\max\{\beta_{NS}A(n,k)-\gamma_{cn}A_{cn}(n,k),0\} \quad (18)$$

In Equation (18), $\beta_{NS}$ 1199 is the desired or target noise suppression limit. For example, if 20 dB suppression is desired, $\beta_{NS}=0.1$. As illustrated in Equation (18), the spectral magnitude estimate A(n,k) 1113 may be weighted or scaled (e.g., through multiplication 1181*c*) by the noise suppression limit $\beta_{NS}$ 1199. The combined noise estimate $A_{cn}(n,k)$ 1191 may be multiplied 1181*b* by the combined noise scaling, weighting or over-subtraction factor $\gamma_{cn}$ 1135 to yield $\gamma_{cn}A_{cn}(n,k)$ 1106. This weighted or scaled combined noise estimate $\gamma_{cn}A_{cn}(n,k)$ 1106 may be subtracted 1108*a* from the weighted or scaled spectral magnitude estimate $\beta_{NS}A(n,k)$ 1102 by the excess noise estimation module 1126. The maximum 1189*b* of that difference and a constant 1110 (e.g., zero) may also be determined by the excess noise estimation module 1126 to yield the excess noise estimate $A_{en}(n,k)$ 1124. It should be noted that the excess noise estimate $A_{en}(n,k)$ 1124 is considered a "short-term" estimate. The excess noise estimate $A_{en}(n,k)$ 1124 is considered a "short-term" estimate because it 1124 is allowed to vary rapidly and allowed to track the noise statistics when there is no active speech.

The excess noise estimate $A_{en}(n,k)$ 1124 may be computed only when the VAD 1125 is inactive (e.g., when no speech is detected). This may be accomplished through an excess noise scaling or weighting factor $\gamma_{en}$ 1114. That is, the excess noise scaling or weighting factor $\gamma_{en}$ 1114 may be a function of the VAD 1125 decision. In one configuration, the $\gamma_{en}$ computation module 1112 sets $\gamma_{en}=0$ if the VAD 1125 is active (e.g., speech or voice is detected) and $0\leq\gamma_{en}\leq1$ if the VAD 1125 is inactive (e.g., speech or voice is not detected).

The excess noise estimate $A_{en}(n,k)$ 1124 may be multiplied 1181*d* by the excess noise scaling or weighting factor $\gamma_{en}$ 1114 to obtain $\gamma_{en}A_{en}(n,k)$. $\gamma_{en}A_{en}(n,k)$ may be added 1108*b* to the scaled or weighted combined noise estimate $\gamma_{cn}A_{cn}(n,k)$ 1106 by the overall noise estimation module 1141 to obtain an overall noise estimate $A_{on}(n,k)$ 1116. The overall noise estimate $A_{on}(n,k)$ 1116 may be expressed as illustrated in Equation (19).

$$A_{on}(n,k)=\gamma_{cn}A_{cn}(n,k)+\gamma_{en}A_{en}(n,k) \quad (19)$$

The overall noise estimate $A_{on}(n,k)$ 1116 may be used to compute a set of gains for application to the input spectral magnitude data A(n,k) 1113. More detail on the gain computation is given below. In another configuration, the overall noise estimate $A_{on}(n,k)$ 1116 may be computed according to Equation (20).

$$A_{on}(n,k)=\gamma_{sn}A_{sn}(n,k)+\gamma_{cn}(\max\{A_{nn}(n,k)-\gamma_{sn}A_{sn}(n,k),0\})+\gamma_{en}A_{en}(n,k) \quad (20)$$

Figure 12:
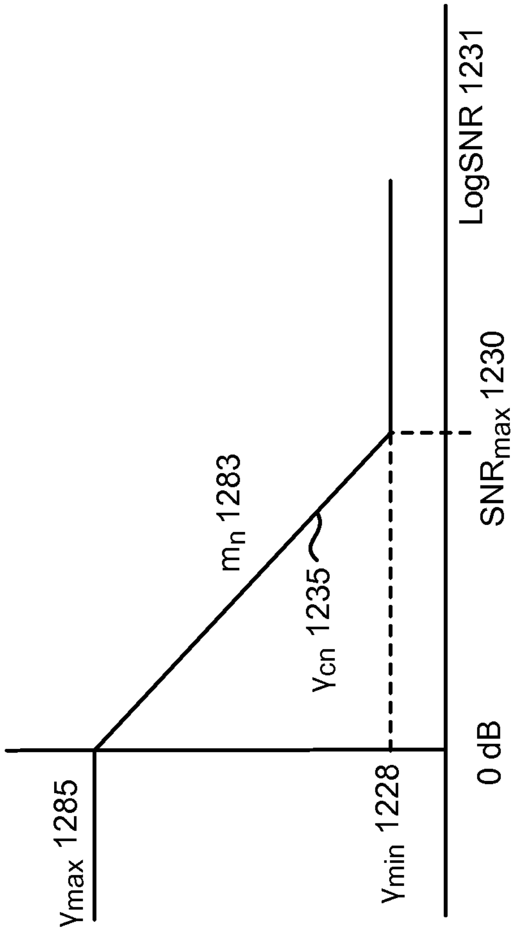
FIG. 12 is a diagram illustrating a more specific function that may be used to determine an over-subtraction factor.

FIG. 12 is a diagram illustrating a more specific function that may be used to determine an over-subtraction factor. The over-subtraction or combined noise scaling factor $\gamma_{cn}$ 1235 may be determined such that if the LogSNR 1231 is low, the combined noise scaling factor $\gamma_{cn}$ 1235 is set to a higher value to remove more noise. Furthermore, if the the LogSNR 1231 is high, the combined noise scaling factor $\gamma_{cn}$ 1135 is set to a lower value (e.g., close to unity) so as to remove less noise and preserve more speech or voice in the output. Equation (21) illustrates another example of an equation for determining the over-subtraction or combined noise scaling factor $\gamma_{cn}$ 1235 as a function of LogSNR 1231.

$$\gamma_{cn}=\gamma_{max} \text{ if LogSNR} \le 0 \text{ dB}$$

$$\gamma_{cn}=\gamma_{max}-m_n\text{LogSNR if } 0 \text{ dB} < \text{LogSNR} < \text{SNR}_{max} \text{ dB} \quad (21)$$

$$\gamma_{cn}=\gamma_{max} \text{ if LogSNR} \ge 20 \text{ dB}$$

In Equation (21), the LogSNR 1231 may be restricted to be within a range of values between a minimum value (e.g., 0 dB) and a maximum value $\text{SNR}_{max}$ 1230 (e.g., 20 dB). $\gamma_{max}$ 1285 is the maximum scaling or weighting factor used when the LogSNR 1231 is 0 dB or less. Additionally, $\gamma_{min}$ 1228 is the minimum scaling or weighting factor used when the LogSNR 1231 is 20 dB or greater. $m_n$ 1283 is a slope factor that decides how much $\gamma_{cn}$ 1235 varies with the LogSNR 1231.

Figure 13:
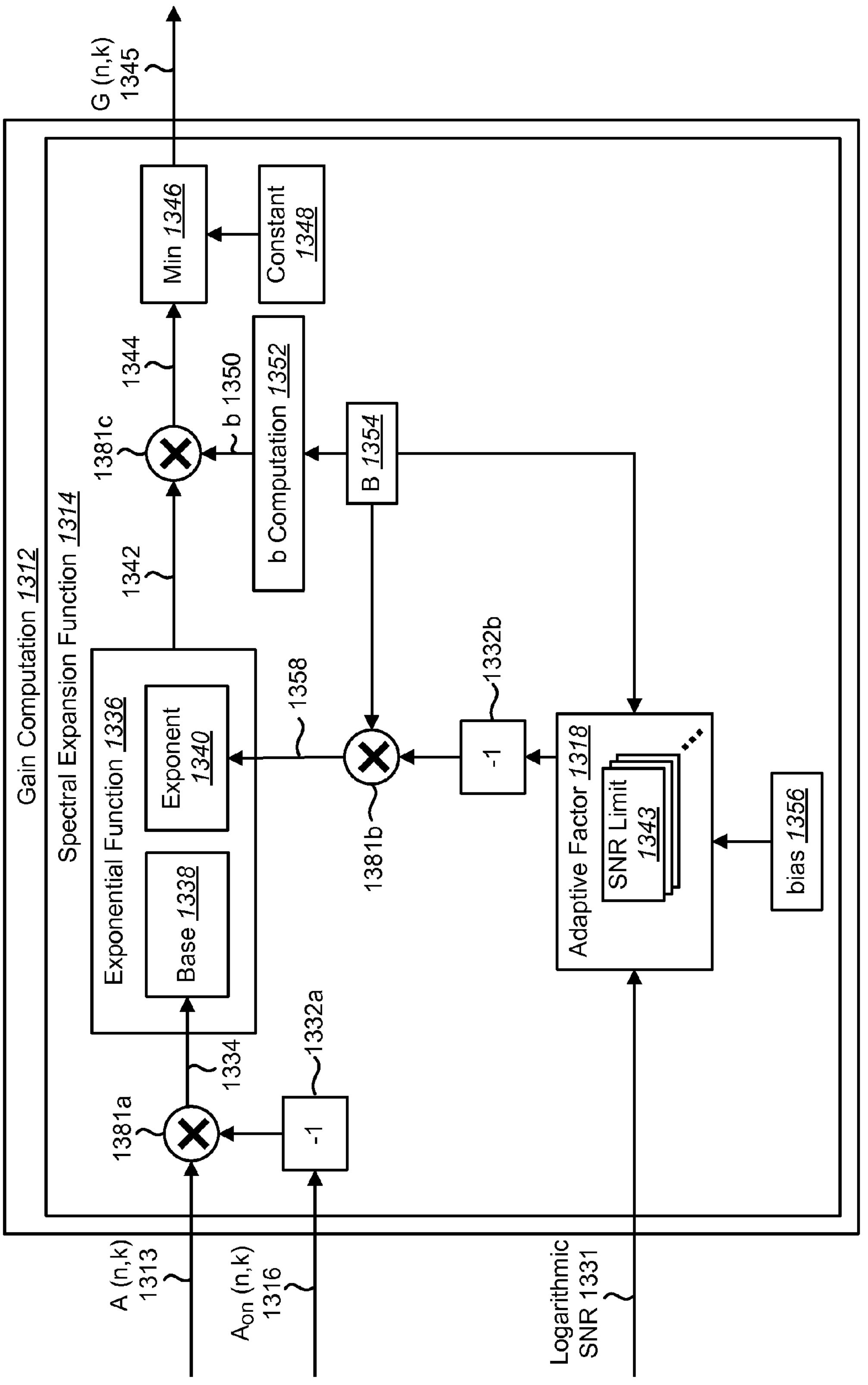
FIG. 13 is a block diagram illustrating a more specific implementation of a gain computation module.

FIG. 13 is a block diagram illustrating a more specific implementation of a gain computation module 1312. According to the systems and methods disclosed herein, the noise suppression algorithm determines a set of frequency dependent gains G(n,k) 1345 that can be applied to the input audio signal for suppressing noise. Other approaches for suppressing noise have been used (e.g., conventional spectral subtraction or Wiener filtering). However, these approaches may introduce significant artifacts if the input SNR is low or if the noise suppression is tuned aggressively.

The systems and methods herein disclose a speech adaptive spectral expansion or companding based gain design that may help preserve speech or voice quality while suppressing noise in an audio signal 104. The gain computation module 1312 may use a spectral expansion function 1314 to compute the set of gains G(n,k) 1345. The spectral expansion gain function 1314 may be based on an overall noise estimate $A_{on}(n,k)$ 1316 and an adaptive factor 1318.

The adaptive factor A 1318 may be computed based on an input SNR (e.g., a logarithmic SNR referred to as LogSNR 1331 for convenience), one or more SNR limits 1343 and a bias 1356. The adaptive factor A 1318 may be computed as illustrated in Equation (22).

$$A=20*\text{LogSNR}-\text{bias if LogSNR}>\text{SNR\_Limit}$$

$$A=B \text{ if LogSNR} \le \text{SNR\_Limit} \quad (22)$$

In Equation (22), bias 1356 is a small number that may be used to shift the value of the adaptive factor A 1318 depending on voice quality preference. For example, $0 \le \text{bias} \le 5$. SNR Limit 1343 is a turning point that decides or determines how the gain curve should behave if the input SNR (e.g., LogSNR 1331) is less than the limit versus more than the limit. LogSNR 1331 may be computed as illustrated above in Equation (15) or (16). As described in connection with FIG. 11, the spectral magnitude estimate A(n,k) 1313 may be smoothed 1118 (e.g., to produce a smoothed spectral magnitude estimate $\overline{A}(n,k)$ 1169) and the combined noise estimate $A_{cn}(n,k)$ 1191 may be smoothed 1122. This may optionally occur before the spectral magnitude estimate A(n,k) 1313 and the combined noise estimate $A_{cn}(n,k)$ 1191 are used to compute the LogSNR 1331 as illustrated in Equation (15) or (16). Also, the LogSNR 1331 itself may be optionally smoothed 1120 as discussed above in relation to FIG. 11. Smoothing 1118, 1122, 1120 may be performed before LogSNR 1331 is used to compute the adaptive factor A 1318. The adaptive factor A 1318 is termed "adaptive" as it depends on LogSNR 1331, which may depend on the (optionally smoothed) spectral magnitude estimate A(n,k) 1313, the combined noise estimate $A_{cn}(n,k)$ 1191 and/or the non-stationary noise estimate $A_{nn}(n,k)$ 1123 as illustrated above in Equation (15) or (16).

The gain computation module 1312 may be designed as a function of the input SNR and is set lower if the SNR is low and is set higher if the SNR is high. For example, the input spectral magnitude A(n,k) 1313 and the overall noise estimate $A_{on}(n,k)$ 1316 may be used to compute a set of gains G(n,k) 1345 as illustrated in Equation (23).

$$G(n,k)=\min\left\{b*\left(\frac{A(n,k)}{A_{on}(n,k)}\right)^{B/A}, 1\right\} \quad (23)$$

In Equation (23), B 1354 is the desired noise suppression limit in dB (e.g., B=20 dB) and may be set according to a user preference for the amount of noise suppression. b 1350 is a minimum bound on the gain and can be computed according to the equation: $b=10^{(-B/20)}$ by the b computation module 1352. The set of gains G(n,k) 1345 may be deemed "short-term," since it may be updated every frame or based on the "short-term" SNR. For example, the short term $$SNR\left(\frac{A(n,k)}{A_{on}(n,k)}\right)$$

is considered short term because it uses all of the noise estimates and may not be very smooth across time. However, the LogSNR 1331 (illustrated in Equation (22)) used to compute the adaptive factor A 1318 may be slowly varying and more smooth.

As illustrated above, the spectral expansion gain function 1314 is a non-linear function of the input SNR. The exponent or power function B/A 1340 in the spectral expansion gain function 1314 serves to expand the spectral magnitude as a function of the SNR $$\left(\text{e.g., } \frac{A(n,k)}{A_{on}(n,k)}\right).$$

According to Equations (22) and (23), if the input SNR (e.g., LogSNR 1331) is less than the SNR Limit 1343, the gain is a linear function of the SNR $$\left(\text{e.g., } \frac{A(n,k)}{A_{on}(n,k)}\right).$$

If the input SNR (e.g., LogSNR 1331) is greater than the SNR_Limit 1343, the gain is expanded and made closer to unity to minimize speech or voice artifacts. The spectral expansion gain function 1314 could also be further modified to introduce multiple SNR_Limits 1343 or turning points such that gain G(n,k) 1345 is determined differently for different SNR regions. The spectral expansion gain function 1314 provides flexibility to tune the gain curve based on the preference of voice quality and noise suppression level.

It should be noted that the two SNRs mentioned above $$\left(\frac{A(n,k)}{A_{on}(n,k)}\right)$$

and LogSNR 1331) are different. For example, the ratio $$\frac{A(n,k)}{A_{on}(n,k)}$$

may track instantaneous SNR changes and thus vary more rapidly across time than the smoother (and/or smoothed) LogSNR 1331. The adaptive factor A 1318 varies as a function of LogSNR 1331 as illustrated above.

As illustrated in Equation (23) and FIG. 13, the spectral expansion function 1314 may multiply 1381*a* the spectral magnitude A(n,k) 1313 by the reciprocal 1332*a* of the overall noise estimate $A_{on}$(n,k) 1316. This product $$\left(\text{e.g., } \frac{A(n,k)}{A_{on}(n,k)}\right)$$

1334 forms the base 1338 of the exponential function 1336. The product (e.g., B/A) 1358 of the desired noise suppression limit B 1354 multiplied 1381*b* by the reciprocal 1332*b* of the adaptive factor A 1318 forms the exponent 1340 (e.g., B/A) of the exponential function 1336. The exponential function output $$\left(\text{e.g., } \left(\frac{A(n,k)}{A_{on}(n,k)}\right)^{B/A}\right)$$

1342 is multiplied 1381*c* by b 1350 to obtain a first term $$\left(\text{e.g., } b*\left(\frac{A(n,k)}{A_{on}(n,k)}\right)^{B/A}\right)$$

1344 for the minimum function 1346. The second term of the minimum function 1346 may be a constant 1348 (e.g., 1). In order to determine the set of gains G(n,k) 1345, the minimum function 1346 determines the minimum of the first term and the second constant 1348 term $$\left(\text{e.g., } G(n,k) = \min\left\{b*\left(\frac{A(n,k)}{A_{on}(n,k)}\right)^{B/A}, 1\right\}\right).$$

Figure 14:
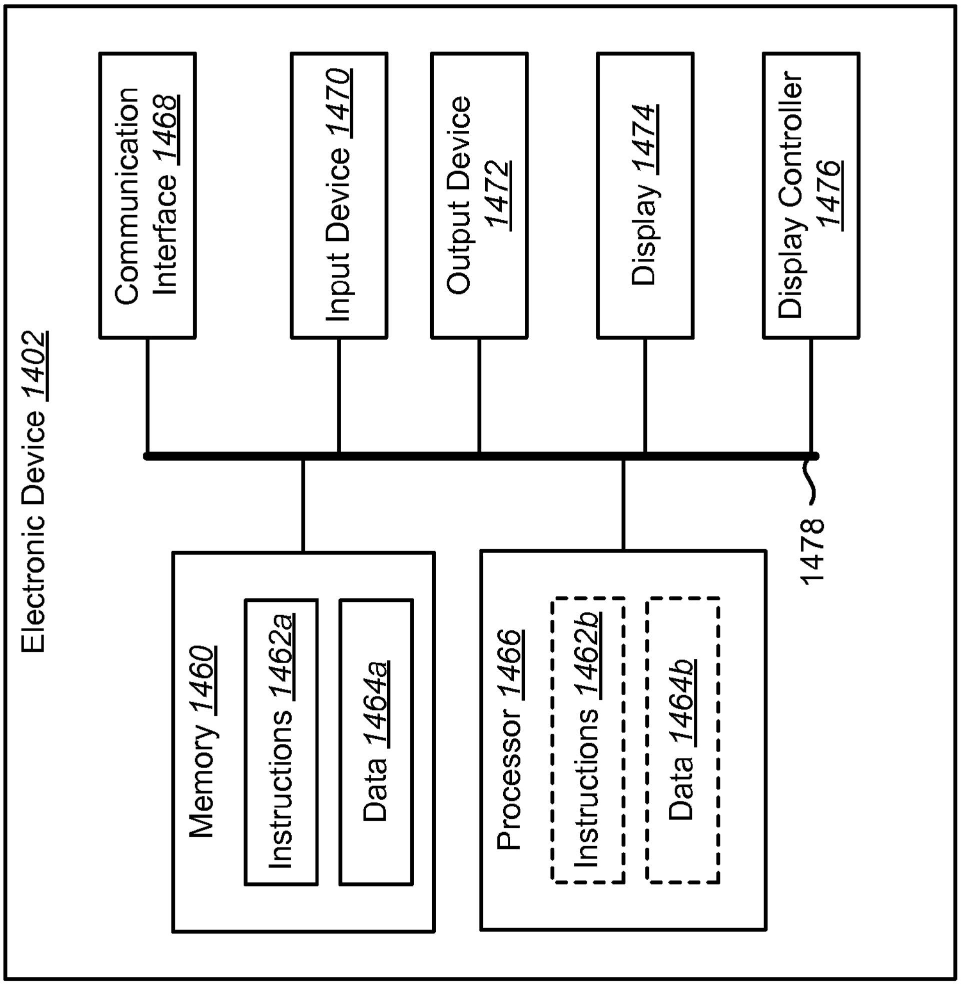
FIG. 14 illustrates various components that may be utilized in an electronic device.

FIG. 14 illustrates various components that may be utilized in an electronic device 1402. The illustrated components may be located within the same physical structure or in separate housings or structures. The electronic devices 102, 202 discussed in relation to FIGS. 1 and 2 may be configured similarly to the electronic device 1402. The electronic device 1402 includes a processor 1466. The processor 1466 may be a general purpose single- or multi-chip microprocessor (e.g., an ARM), a special purpose microprocessor (e.g., a digital signal processor (DSP)), a microcontroller, a programmable gate array, etc. The processor 1466 may be referred to as a central processing unit (CPU). Although just a single processor 1466 is shown in the electronic device 1402 of FIG. 14, in an alternative configuration, a combination of processors (e.g., an ARM and DSP) could be used.

The electronic device 1402 also includes memory 1460 in electronic communication with the processor 1466. That is, the processor 1466 can read information from and/or write information to the memory 1460. The memory 1460 may be any electronic component capable of storing electronic information. The memory 1460 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1464*a* and instructions 1462*a* may be stored in the memory 1460. The instructions 1462*a* may include one or more programs, routines, sub-routines, functions, procedures, etc. The instructions 1462*a* may include a single computer-readable statement or many computer-readable statements. The instructions 1462*a* may be executable by the processor 1466 to implement the methods 700, 800 that were described above. Executing the instructions 1462*a* may involve the use of the data 1464*a* that is stored in the memory 1460. FIG. 14 shows some instructions 1462*b* and data 1464*b* being loaded into the processor 1466.

The electronic device 1402 may also include one or more communication interfaces 1468 for communicating with other electronic devices. The communication interfaces 1468 may be based on wired communication technology, wireless communication technology, or both. Examples of different types of communication interfaces 1468 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1402 may also include one or more input devices 1470 and one or more output devices 1472. Examples of different kinds of input devices 1470 include a keyboard, mouse, microphone, remote control device, button, joystick, trackball, touchpad, lightpen, etc. Examples of different kinds of output devices 1472 include a speaker, printer, etc. One specific type of output device which may be typically included in an electronic device 1402 is a display device 1474. Display devices 1474 used with configurations disclosed herein may utilize any suitable image projection technology, such as a cathode ray tube (CRT), liquid crystal display (LCD), light-emitting diode (LED), gas plasma, electroluminescence, or the like. A display controller 1476 may also be provided, for converting data stored in the memory 1460 into text, graphics, and/or moving images (as appropriate) shown on the display device 1474.

The various components of the electronic device 1402 may be coupled together by one or more buses, which may include a power bus, a control signal bus, a status signal bus, a data bus, etc. For simplicity, the various buses are illustrated in FIG. 14 as a bus system 1478. It should be noted that FIG. 14 illustrates only one possible configuration of an electronic device 1402. Various other architectures and components may be utilized.

Figure 15:
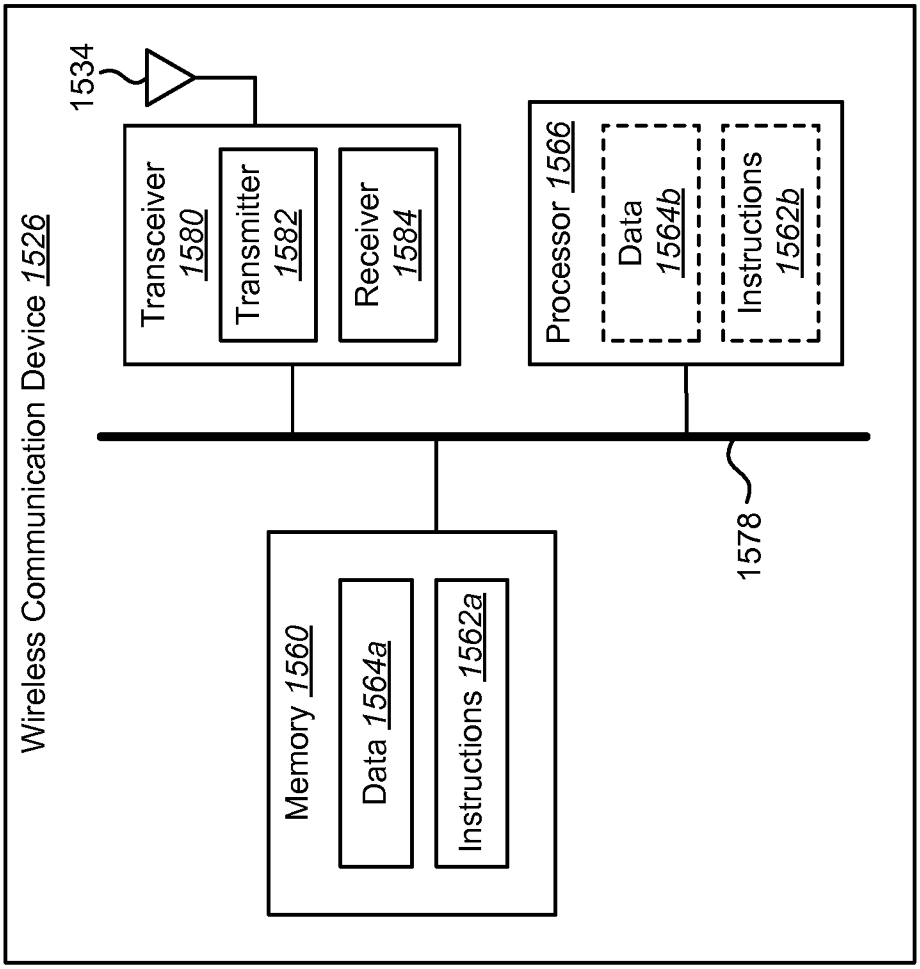
FIG. 15 illustrates certain components that may be included within a wireless communication device.

FIG. 15 illustrates certain components that may be included within a wireless communication device 1526. The wireless communication devices 326, 426, 526*a-b* described previously may be configured similarly to the wireless communication device 1526 that is shown in FIG. 15. The wireless communication device 1526 includes a processor 1566. The processor 1566 may be a general purpose single- or multi-chip microprocessor (e.g., an ARM), a special purpose microprocessor (e.g., a digital signal processor (DSP)), a microcontroller, a programmable gate array, etc. The processor 1566 may be referred to as a central processing unit (CPU). Although just a single processor 1566 is shown in the wireless communication device 1526 of FIG. 15, in an alternative configuration, a combination of processors (e.g., an ARM and DSP) could be used.

The wireless communication device 1526 also includes memory 1560 in electronic communication with the processor 1566 (i.e., the processor 1566 can read information from and/or write information to the memory 1560). The memory 1560 may be any electronic component capable of storing electronic information. The memory 1560 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1564*a* and instructions 1562*a* may be stored in the memory 1560. The instructions 1562*a* may include one or more programs, routines, sub-routines, functions, procedures, etc. The instructions 1562*a* may include a single computer-readable statement or many computer-readable statements. The instructions 1562*a* may be executable by the processor 1566 to implement the methods 700, 800 that were described above. Executing the instructions 1562*a* may involve the use of the data 1564*a* that is stored in the memory 1560. FIG. 15 shows some instructions 1562*b* and data 1564*b* being loaded into the processor 1566.

The wireless communication device 1526 may also include a transmitter 1582 and a receiver 1584 to allow transmission and reception of signals between the wireless communication device 1526 and a remote location (e.g., a base station or other wireless communication device). The transmitter 1582 and receiver 1584 may be collectively referred to as a transceiver 1580. An antenna 1534 may be electrically coupled to the transceiver 1580. The wireless communication device 1526 may also include (not shown) multiple transmitters, multiple receivers, multiple transceivers and/or multiple antenna.

The various components of the wireless communication device 1526 may be coupled together by one or more buses, which may include a power bus, a control signal bus, a status signal bus, a data bus, etc. For simplicity, the various buses are illustrated in FIG. 15 as a bus system 1578.

Figure 16:
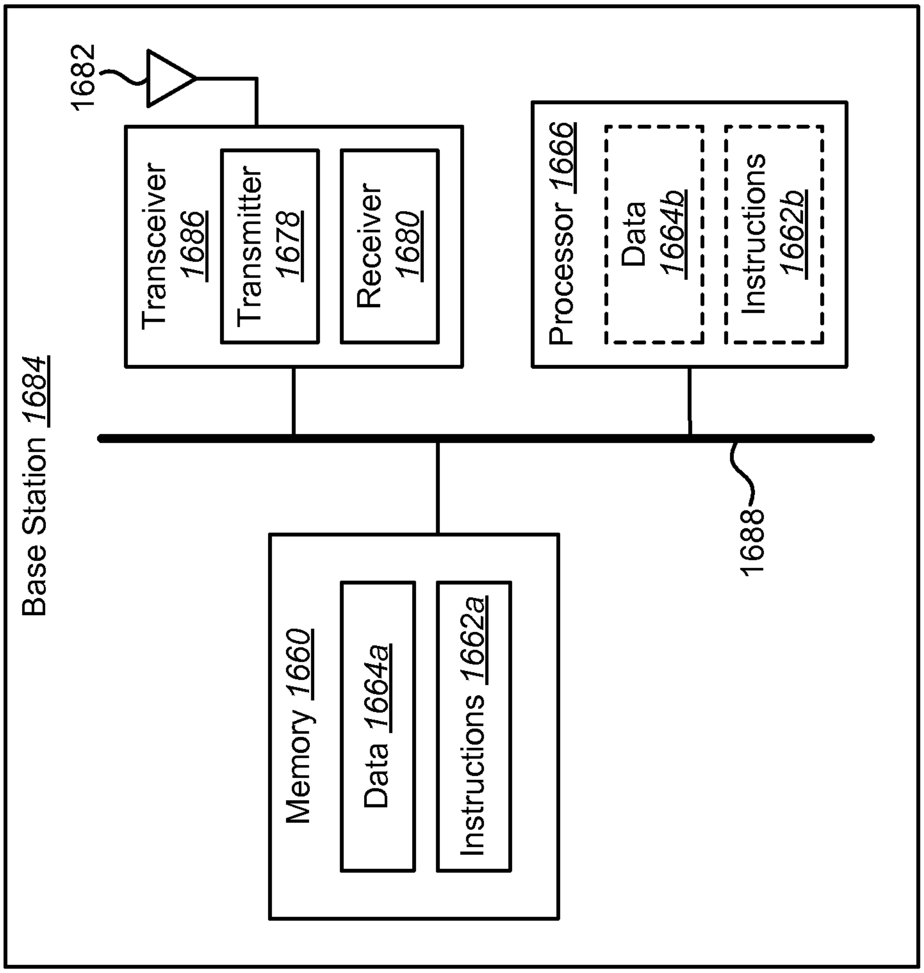
FIG. 16 illustrates certain components that may be included within a base station.

FIG. 16 illustrates certain components that may be included within a base station 1684. The base station 584 discussed previously may be configured similarly to the base station 1684 shown in FIG. 16. The base station 1684 includes a processor 1666. The processor 1666 may be a general purpose single- or multi-chip microprocessor (e.g., an ARM), a special purpose microprocessor (e.g., a digital signal processor (DSP)), a microcontroller, a programmable gate array, etc. The processor 1666 may be referred to as a central processing unit (CPU). Although just a single processor 1666 is shown in the base station 1684 of FIG. 16, in an alternative configuration, a combination of processors (e.g., an ARM and DSP) could be used.

The base station 1684 also includes memory 1660 in electronic communication with the processor 1666 (i.e., the processor 1666 can read information from and/or write information to the memory 1660). The memory 1660 may be any electronic component capable of storing electronic information. The memory 1660 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1664*a* and instructions 1662*a* may be stored in the memory 1660. The instructions 1662*a* may include one or more programs, routines, sub-routines, functions, procedures, etc. The instructions 1662*a* may include a single computer-readable statement or many computer-readable statements. The instructions 1662*a* may be executable by the processor 1666 to implement the methods 700, 800 disclosed herein. Executing the instructions 1662*a* may involve the use of the data 1664*a* that is stored in the memory 1660. FIG. 16 shows some instructions 1662*b* and data 1664*b* being loaded into the processor 1666.

The base station 1684 may also include a transmitter 1678 and a receiver 1680 to allow transmission and reception of signals between the base station 1684 and a remote location (e.g., a wireless communication device). The transmitter 1678 and receiver 1680 may be collectively referred to as a transceiver 1686. An antenna 1682 may be electrically coupled to the transceiver 1686. The base station 1684 may also include (not shown) multiple transmitters, multiple receivers, multiple transceivers and/or multiple antenna.

The various components of the base station 1684 may be coupled together by one or more buses, which may include a power bus, a control signal bus, a status signal bus, a data bus, etc. For simplicity, the various buses are illustrated in FIG. 16 as a bus system 1688.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

In accordance with the systems and methods disclosed herein, a circuit, in an electronic device, may be adapted to receive an input audio signal. The same circuit, a different circuit, or a second section of the same or different circuit may be adapted to compute an overall noise estimate based on a stationary noise estimate, a non-stationary noise estimate and an excess noise estimate. In addition, the same circuit, a different circuit, or a third section of the same or different circuit may be adapted to compute an adaptive factor based on an input Signal-to-Noise Ratio (SNR) and one or more SNR limits. A fourth section of the same or a different circuit may be adapted to compute a set of gains using a spectral expansion gain function, wherein the spectral expansion gain function is based on the overall noise estimate and the adaptive factor. The portion of the circuit adapted to compute the set of gains may be coupled to the portion of the circuit adapted to compute the overall noise estimate and/or the portion of the circuit adapted to compute the adaptive factor, or it may be the same circuit. A fifth section of the same or a different circuit may be adapted to apply the set of gains to the input audio signal to produce a noise-suppressed audio signal. The portion of the circuit adapted to apply the set of gains to the input audio signal may be coupled to the first section and/or the fourth section, or it may be the same circuit. A sixth section of the same or a different circuit may be adapted to provide the noise-suppressed audio signal. The sixth section may advantageously be coupled to the fifth section of the circuit, or it may be embodied as the same circuit as the fifth section.

The term “determining” encompasses a wide variety of actions and, therefore, “determining” can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for suppressing noise in an audio signal, comprising:
- a processor;
- memory in electronic communication with the processor;
- instructions stored in the memory, the instructions being executable to:
  - receive an input audio signal;
  - compute an overall noise estimate based on a stationary noise estimate, a non-stationary noise estimate and an excess noise estimate;
  - compute an adaptive factor based on an input Signal-to-Noise Ratio (SNR) and one or more SNR limits, wherein each SNR limit is a turning point;
  - compute a set of gains using a spectral expansion gain function, wherein the spectral expansion gain function is based on the overall noise estimate and the adaptive factor;
  - apply the set of gains to the input audio signal to produce a noise-suppressed audio signal; and
  - provide the noise-suppressed audio signal.

2. The electronic device of claim 1, wherein the instructions are further executable to compute weights for the stationary noise estimate, the non-stationary noise estimate and the excess noise estimate.

3. The electronic device of claim 1, wherein the stationary noise estimate is computed by tracking power levels of the input audio signal.

4. The electronic device of claim 3, wherein tracking power levels of the input audio signal is implemented using a sliding window.

5. The electronic device of claim 1, wherein the non-stationary noise estimate comprises a long-term estimate.

6. The electronic device of claim 1, wherein the excess noise estimate comprises a short-term estimate.

7. The electronic device of claim 1, wherein the spectral expansion gain function is further based on a short-term SNR estimate.

8. The electronic device of claim 1, wherein the spectral expansion gain function comprises a base and an exponent, wherein the base comprises an input signal power divided by the overall noise estimate, and the exponent comprises a desired noise suppression level divided by the adaptive factor.

9. The electronic device of claim 1, wherein the instructions are further executable to compress the input audio signal into a number of frequency bins.

10. The electronic device of claim 9, wherein the compression comprises averaging data across multiple frequency bins, and wherein lower frequency data in one or more lower frequency bins is compressed less than higher frequency data in one or more high frequency bins.

11. The electronic device of claim 1, wherein the instructions are further executable to:
- compute a Discrete Fourier Transform (DFT) of the input audio signal; and
- compute an Inverse Discrete Fourier Transform (IDFT) of the noise-suppressed audio signal.

12. The electronic device of claim 1, wherein the electronic device comprises a wireless communication device.

13. The electronic device of claim 1, wherein the electronic device comprises a base station.

14. The electronic device of claim 1, wherein the instructions are further executable to store the noise-suppressed audio signal in the memory.

15. The electronic device of claim 1, wherein the input audio signal is received from a remote wireless communication device.

16. The electronic device of claim 1, wherein the one or more SNR limits are multiple turning points used to determine gains differently for different SNR regions.

17. The electronic device of claim 1, wherein the spectral expansion gain function is computed according to the equation $$G(n,k)=\min\left\{b*\left(\frac{A(n,k)}{A_{on}(n,k)}\right)^{B/A},1\right\};$$

wherein G(n,k) is the set of gains, n is a frame number, k is a bin number, B is a desired noise suppression limit, A is the adaptive factor, b is a factor based on B, A(n,k) is an input magnitude estimate and $A_{on}(n,k)$ is the overall noise estimate.

18. The electronic device of claim 1, wherein the excess noise estimate is computed according to the equation $A_{en}(n,k)=\max\{\beta_{NS}A(n,k)-\gamma_{cn}A_{cn}(n,k),0\}$; wherein $A_{en}(n,k)$ is the excess noise estimate, n is a frame number, k is a bin number, $\beta_{NS}$ is a desired noise suppression limit, A(n,k) is an input magnitude estimate, $\gamma_{cn}$ is a combined scaling factor and $A_{cn}(n,k)$ is a combined noise estimate.

19. The electronic device of claim 1, wherein the overall noise estimate is computed according to the equation $A_{on}(n,k)=\gamma_{cn}A_{cn}(n,k)+\gamma_{en}A_{en}(n,k)$; wherein $A_{on}(n,k)$ is the overall noise estimate, n is a frame number, k is a bin number, $\gamma_{cn}$ is a combined scaling factor, $A_{cn}(n,k)$ is a combined noise estimate, $\gamma_{en}$ is an excess noise scaling factor and $A_{en}(n,k)$ is the excess noise estimate.

20. The electronic device of claim 1, wherein the input audio signal is a wideband audio signal that is split into multiple frequency bands, wherein noise suppression is performed on each of the multiple frequency bands.

21. The electronic device of claim 1, wherein the instructions are further executable to smooth the stationary noise estimate, a combined noise estimate, the input SNR and the set of gains.

22. A method for suppressing noise in an audio signal, comprising:

receiving an input audio signal;

computing, on an electronic device, an overall noise estimate based on a stationary noise estimate, a non-stationary noise estimate and an excess noise estimate;

computing, on the electronic device, an adaptive factor based on an input Signal-to-Noise Ratio (SNR) and one or more SNR limits, wherein each SNR limit is a turning point;

computing, on the electronic device, a set of gains using a spectral expansion gain function, wherein the spectral expansion gain function is based on the overall noise estimate and the adaptive factor;

applying the set of gains to the input audio signal to produce a noise-suppressed audio signal; and providing the noise-suppressed audio signal.

23. The method of claim 22, further comprising computing weights for the stationary noise estimate, the non-stationary noise estimate and the excess noise estimate.

24. The method of claim 22, wherein the stationary noise estimate is computed by tracking power levels of the input audio signal.

25. The method of claim 24, wherein tracking power levels of the input audio signal is implemented using a sliding window.

26. The method of claim 22, wherein the non-stationary noise estimate comprises a long-term estimate.

27. The method of claim 22, wherein the excess noise estimate comprises a short-term estimate.

28. The method of claim 22, wherein the spectral expansion gain function is further based on a short-term SNR estimate.

29. The method of claim 22, wherein the spectral expansion gain function comprises a base and an exponent, wherein the base comprises an input signal power divided by the overall noise estimate, and the exponent comprises a desired noise suppression level divided by the adaptive factor.

30. The method of claim 22, further comprising compressing the input audio signal into a number of frequency bins.

31. The method of claim 30, wherein the compression comprises averaging data across multiple frequency bins, and wherein lower frequency data in one or more lower frequency bins is compressed less than higher frequency data in one or more high frequency bins.

32. The method of claim 22, further comprising:

computing a Discrete Fourier Transform (DFT) of the input audio signal; and computing an Inverse Discrete Fourier Transform (IDFT) of the noise-suppressed audio signal.

33. The method of claim 22, wherein the electronic device comprises a wireless communication device.

34. The method of claim 22, wherein the electronic device comprises a base station.

35. The method of claim 22, further comprising storing the noise-suppressed audio signal in memory.

36. The method of claim 22, wherein the input audio signal is received from a remote wireless communication device.

37. The method of claim 22, wherein the one or more SNR limits are multiple turning points used to determine gains differently for different SNR regions.

38. The method of claim 22, wherein the spectral expansion gain function is computed according to the equation $$G(n,k)=\min\left\{b*\left(\frac{A(n,k)}{A_{on}(n,k)}\right)^{B/A},1\right\};$$

wherein G(n,k) is the set of gains, n is a frame number, k is a bin number, B is a desired noise suppression limit, A is the adaptive factor, b is a factor based on B, A(n,k) is an input magnitude estimate and $A_{on}(n,k)$ is the overall noise estimate.

39. The method of claim 22, wherein the excess noise estimate is computed according to the equation $A_{en}(n,k)=\max\{\beta_{NS}A(n,k)-\gamma_{cn}A_{cn}(n,k), 0\}$; wherein $A_{en}(n,k)$ is the excess noise estimate, n is a frame number, k is a bin number, $\beta_{NS}$ is a desired noise suppression limit, A(n,k) is an input magnitude estimate, $\gamma_{cn}$ is a combined scaling factor and $A_{cn}(n,k)$ is a combined noise estimate.

40. The method of claim 22, wherein the overall noise estimate is computed according to the equation $A_{on}(n,k)=\gamma_{cn}A_{cn}(n,k)+\gamma_{en}A_{en}(n,k)$; wherein $A_{on}(n,k)$ is the overall noise estimate, n is a frame number, k is a bin number, $\gamma_{cn}$ is a combined scaling factor, $A_{cn}(n,k)$ is a combined noise estimate, $\gamma_{en}$ is an excess noise scaling factor and $A_{en}(n,k)$ is the excess noise estimate.

41. The method of claim 22, wherein the input audio signal is a wideband audio signal that is split into multiple frequency bands, wherein noise suppression is performed on each of the multiple frequency bands.

42. The method of claim 22, further comprising smoothing the stationary noise estimate, a combined noise estimate, the input SNR and the set of gains.

43. A computer-program product for suppressing noise in an audio signal, the computer-program product comprising a non-transitory computer-readable medium having instructions thereon, the instructions comprising:

code for receiving an input audio signal;

code for computing an overall noise estimate based on a stationary noise estimate, a non-stationary noise estimate and an excess noise estimate;

code for computing an adaptive factor based on an input Signal-to-Noise Ratio (SNR) and one or more SNR limits, wherein each SNR limit is a turning point;

code for computing a set of gains using a spectral expansion gain function, wherein the spectral expansion gain function is based on the overall noise estimate and the adaptive factor;

code for applying the set of gains to the input audio signal to produce a noise-suppressed audio signal; and code for providing the noise-suppressed audio signal.

44. The computer-program product of claim 43, wherein the spectral expansion gain function is computed according to the equation $$G(n,k)=\min\left\{b*\left(\frac{A(n,k)}{A_{on}(n,k)}\right)^{B/A},1\right\};$$

wherein G(n,k) is the set of gains, n is a frame number, k is a bin number, B is a desired noise suppression limit, A is the adaptive factor, b is a factor based on B, A(n,k) is an input magnitude estimate and $A_{on}(n,k)$ is the overall noise estimate.

45. The computer-program product of claim 43, wherein the excess noise estimate is computed according to the equation $A_{en}(n,k)=\max\{\beta_{NS}A(n,k)-\gamma_{cn}A_{cn}(n,k)0\}$; wherein $A_{en}(n,k)$ is the excess noise estimate, n is a frame number, k is a bin number, $\beta_{NS}$ is a desired noise suppression limit, A(n,k) is an input magnitude estimate, $\gamma_{cn}$ is a combined scaling factor and $A_{cn}(n,k)$ is a combined noise estimate.

46. The computer-program product of claim 43, wherein the overall noise estimate is computed according to the equation $A_{on}(n,k)=\gamma_{cn}A_{cn}(n,k)+\gamma_{en}A_{en}(n,k)$; wherein $A_{on}(n,k)$ is the overall noise estimate, n is a frame number, k is a bin number, $y_{cn}$ is a combined scaling factor, $A_{cn}(n,k)$ is a combined noise estimate, $\gamma_{en}$ is an excess noise scaling factor and $A_{en}(n,k)$ is the excess noise estimate.

* * * * *